US012577328B2

(12) United States Patent
Ochi et al.

(10) Patent No.: US 12,577,328 B2
(45) Date of Patent: *Mar. 17, 2026

(54) BORATE COMPOUND-CONTAINING COMPOSITION

(71) Applicant: AGC INC., Tokyo (JP)

(72) Inventors: Yosuke Ochi, Tokyo (JP); Takuya Fujimoto, Tokyo (JP)

(73) Assignee: AGC INC., Tokyo (JP)

( * ) Notice: Subject to any disclaimer, the term of this patent is extended or adjusted under 35 U.S.C. 154(b) by 766 days.

This patent is subject to a terminal disclaimer.

(21) Appl. No.: 17/930,560

(22) Filed: Sep. 8, 2022

(65) Prior Publication Data

US 2023/0028045 A1 Jan. 26, 2023

Related U.S. Application Data

(63) Continuation of application No. PCT/JP2021/009164, filed on Mar. 9, 2021.

(30) Foreign Application Priority Data

Mar. 12, 2020 (JP) ................................ 2020-043244
Aug. 28, 2020 (JP) ................................ 2020-144176
Nov. 27, 2020 (JP) ................................ 2020-196703

(51) Int. Cl.

*C07F 5/02* (2006.01)
*C08F 4/52* (2006.01)
*C08F 4/64* (2006.01)
*C08F 4/6592* (2006.01)
*C08F 210/16* (2006.01)

(52) U.S. Cl.

CPC ............ *C08F 4/65927* (2013.01); *C07F 5/02* (2013.01); *C07F 5/027* (2013.01); *C08F 210/16* (2013.01); *C08F 4/52* (2013.01); *C08F 2420/10* (2021.01)

(58) Field of Classification Search

CPC .................................. C07F 5/02; C07F 5/027
See application file for complete search history.

(56) References Cited

U.S. PATENT DOCUMENTS 5,783,512 A * 7/1998 Jacobsen ................ C07F 17/00 502/118
5,919,983 A * 7/1999 Rosen .................... C07F 5/027 526/132
6,121,185 A 9/2000 Rosen et al.
6,162,950 A 12/2000 Lee et al.
6,215,025 B1 * 4/2001 Mitsui .................... C07F 5/027 568/1
6,255,531 B1 * 7/2001 Fritz ..................... C07F 7/0803 556/170
6,271,165 B1 * 8/2001 Jacobsen ................ C07F 17/00 502/118
6,291,695 B1 * 9/2001 Marks ................... B01J 31/146 526/170
6,380,435 B2 * 4/2002 Mitsui .................... C07F 5/027 568/1
6,545,088 B1 * 4/2003 Kolthammer ....... C08L 23/0815 525/324
6,624,329 B2 * 9/2003 Mitsui .................... C07F 5/027 568/1
6,627,573 B2 * 9/2003 Babb ..................... C07F 7/0803 502/414
6,630,555 B2 * 10/2003 Kendall ................. C07F 5/025 526/195
6,683,218 B1 * 1/2004 Mitsui ...................... C07F 5/02 568/6
7,332,551 B2 * 2/2008 Rodriguez ............. C08F 10/00 502/103
12,325,763 B2 * 6/2025 Jo ........................ C08F 110/10
(Continued)

FOREIGN PATENT DOCUMENTS

JP 10310588 A * 11/1998 ............... C07F 5/02
JP 2000-507157 A 6/2000
(Continued)

OTHER PUBLICATIONS

Brookhart, M.; Grant, B.; Volpe, Jr., A.F. Organometallics 1992, 11, 3920-3922. (Year: 1992).*
(Continued)

*Primary Examiner* — Rip A Lee
(74) *Attorney, Agent, or Firm* — Oblon, McClelland, Maier & Neustadt, L.L.P.

(57) ABSTRACT

A borate compound-composition may contain soluble in hydrocarbon solvents and useful as a cocatalyst for solution polymerization of olefins or dienes. A composition containing a compound of formula (1)

(1)

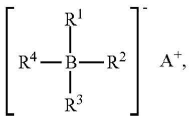

and a compound of formula (4):

(4)

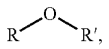

wherein each symbol is as defined in the specification, which is useful as a cocatalyst for polymerization of olefins or dienes, and a production method thereof can be provided.

20 Claims, No Drawings

(56) References Cited

U.S. PATENT DOCUMENTS

| | | | | |
|---|---|---|---|---|
| 2007/0197831 | A1* | 8/2007 | Lee | C07F 5/027 568/6 |
| 2023/0021628 | A1* | 1/2023 | Fujimoto | B01J 31/02 |
| 2023/0183393 | A1* | 6/2023 | Fujimoto | C07F 5/02 526/198 |

FOREIGN PATENT DOCUMENTS

| | | | | | |
|---|---|---|---|---|---|
| JP | 2003335786 | A | * | 11/2003 | C07F 5/02 |
| JP | 2007-530673 | A | | 11/2007 | |
| JP | 4215852 | B2 | * | 1/2009 | C07F 5/02 |
| JP | 2018-104335 | A | | 7/2018 | |
| JP | 2019-59795 | A | | 4/2019 | |
| WO | WO-2019/210027 | A1 | | 10/2019 | |

OTHER PUBLICATIONS

Jutzi, P.; Muller, C.; Stammler, A.; Stammler, H.-G. Organometallics 2000, 19, 1442-1444. (Year: 2000).*

* cited by examiner

BORATE COMPOUND-CONTAINING COMPOSITION

CROSS-REFERENCE TO RELATED APPLICATIONS

The present application is a bypass continuation of international application PCT/JP2021/009164, filed on Mar. 9, 2021, and claims the benefit of the filing date of Japanese Appl. No. 2020-043244, 2020-144176, and 2020-196703, respectively filed on March 12, August 28, and Nov. 27, 2020.

TECHNICAL FIELD

The present invention relates to a borate compound-containing composition useful as a cocatalyst for the solution polymerization system of olefins or dienes, and a production method thereof.

BACKGROUND ART

Many reports have been conventionally made on the use of metallocene compound and non-metallocene type metal complex catalysts such as diimine complex, phenoxy complex, and the like as catalysts for the polymerization of olefins and dienes. In many of these catalyst systems using metal complex catalysts, methylaluminoxane and tetrakis (pentafluorophenyl)borate compounds are used as cocatalysts for stabilizing active species. Tetrakis(pentafluorophenyl)borate compounds are widely used as cocatalysts in solution polymerization systems since they are superior to methylaluminoxane in thermal stability, and the stoichiometric ratio used for metal complexes is lower than that of methylaluminoxane.

In addition, as a solvent used for polymerization of olefins and dienes by a metal complex catalyst, a non-polar hydrocarbon solvent is generally used. In particular, from the aspects of odor and toxicity, switching to aliphatic hydrocarbon solvents such as hexane and the like from aromatic hydrocarbon solvents such as toluene and the like is progressing.

However, it is known that general tetrakis(pentafluorophenyl)borate compounds are hardly soluble in aromatic hydrocarbon solvents such as toluene and the like, and that even if dissolved, they are separated to form two liquid-liquid phases of a concentrated phase in which the borate compound is dissolved and a dilute phase in which it is not dissolved (Patent document 1).

In addition, since general tetrakis(pentafluorophenyl)borate compounds are hardly soluble in aliphatic hydrocarbon solvents such as hexane, heptane, and the like, a tetrakis (pentafluorophenyl)borate compound soluble in aliphatic hydrocarbon solvents is desired and has been proposed (Patent document 2). Di(Octadecyl)methylammonium tetrakis(pentafluorophenyl)borate and bis(hydrogenated tallow)methylammonium tetrakis(pentafluorophenyl)borate described in Patent document 2 are useful as compounds easily soluble in hydrocarbon solvents.

However, in the production method described in Patent document 2, lithium tetrakis(pentafluorophenyl)borate and hydrochloride of dialkylmethylamine prepared separately are reacted for preparation. With regard to this method, it is feared that lithium tetrakis(pentafluorophenyl)borate, which is a hardly water-soluble starting material, or hydrochloride of long chain aliphatic amine remains in the resultant product to be a catalyst poison, which prevents exhibition of sufficient activity when used as a cocatalyst for polymerization. In fact, in Example 2 of Patent document 2, since diethyl ether remains in the resultant product, it is presumed that a diethyl ether complex of hardly water-soluble lithium tetrakis(pentafluorophenyl)borate remains.

Patent document 3 discloses a production method of an ammonium tetrakis(pentafluorophenyl)borate derivative by mixing an alkali metal salt of tetrakis(pentafluorophenyl) borate with an amine, and then treating the mixture with a protic acid. However, even in this method, it is feared that an ether complex of an alkali metal salt of tetrakis(pentafluorophenyl)borate or a protic acid salt of long chain aliphatic amine remains in the resultant product and acts as a catalyst poison.

Patent document 4 discloses a composition containing a trialkyl ammonium tetrakis(pentafluorophenyl)borate compound and an amine compound, and a production method thereof, and discloses that the composition is soluble in hydrocarbon solvents. However, trialkylamine which is the amine compound described in Patent document 4 has high basicity and also has nucleophilic property. Thus, it is feared that it becomes a catalyst poison in the polymerization reaction of olefins or dienes.

CITATION LIST

Patent Document

[Patent Document 1]
JP-A-2018-104335
[Patent Document 2]
Japanese Translation of PCT Application Publication No. 2000-507157
[Patent Document 3]
Japanese Translation of PCT Application Publication No. 2007-530673
[Patent Document 4]
JP-A-2019-59795

SUMMARY OF INVENTION

Problems to be Solved by the Invention

In view of those conventional techniques, the present invention aims to provide a borate compound-containing composition, which is soluble in hydrocarbon solvents, particularly aliphatic hydrocarbon solvents, and does not become a catalyst poison for the polymerization reaction of olefin and diene, and an industrial production method thereof.

Means of Solving the Problems

The present inventors have conducted intensive studies and found for the first time that a composition containing a compound represented by the following formula (1) and a compound represented by the following formula (4):

(1)

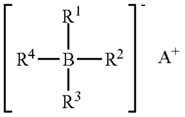

-continued (4)

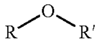

wherein $R^1$, $R^2$, $R^3$ and $R^4$ are each independently a $C_{6-14}$ aryl group substituted by one or more fluorine atoms or one or more fluoro $C_{1-4}$ alkyl groups, $A^+$ is a hydrogen ion ($H^+$), a cation having a total carbon number of not less than 25 and represented by the formula (2):

(2)

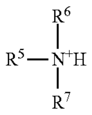

wherein $R^5$, $R^6$ and $R^7$ are each independently an optionally substituted $C_{1-30}$ alkyl group, or an optionally substituted $C_{6-14}$ aryl group, or a cation having a total carbon number of not less than 25 and represented by the formula (3):

(3)

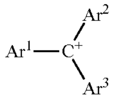

wherein $Ar^1$, $Ar^2$ and $Ar^3$ are each independently a $C_{6-14}$ aryl group optionally substituted by one or more $C_{1-30}$ alkyl groups or $C_{1-30}$ alkoxy groups, and R and R' are each independently an optionally substituted $C_{1-30}$ alkyl group, an optionally substituted $C_{3-15}$ cycloalkyl group, or an optionally substituted $C_{6-14}$ aryl group, provided that when $A^4$ is a hydrogen ion ($H^+$), a total carbon number of R and R' is not less than 20, and a content of the compound represented by the aforementioned formula (4) with respect to 1 mol of the compound represented by the aforementioned formula (1) is not less than 2 mol, and when $A^+$ is a cation represented by the formula (2) or a cation represented by the formula (3), a total carbon number of R and R' is not less than 8 (hereinafter to be also referred to as "the composition of the present invention") is soluble in hydrocarbon solvents, particularly aliphatic hydrocarbon solvents, does not allow generation of a compound to be a catalyst poison for the polymerization reaction of olefin and diene, and is useful as a cocatalyst, and completed the present invention.

Accordingly, the present invention provides the following.

[1] A composition containing a compound represented by the following formula (1) and a compound represented by the following formula (4):

(1)

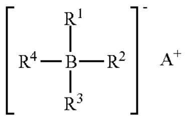

-continued (4)

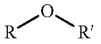

wherein $R^1$, $R^2$, $R^3$ and $R^4$ are each independently a $C_{6-14}$ aryl group substituted by one or more fluorine atoms or one or more fluoro $C_{1-4}$ alkyl groups, $A^+$ is a hydrogen ion ($H^+$), a cation having a total carbon number of not less than 25 and represented by the formula (2):

(2)

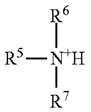

wherein $R^5$, $R^6$ and $R^7$ are each independently an optionally substituted $C_{1-30}$ alkyl group, or an optionally substituted $C_{6-14}$ aryl group, or a cation having a total carbon number of not less than 25 and represented by the formula (3):

(3)

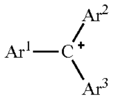

wherein $Ar^1$, $Ar^2$ and $Ar^3$ are each independently a $C_{6-14}$ aryl group optionally substituted by one or more $C_{1-30}$ alkyl groups or $C_{1-30}$ alkoxy groups, and R and R' are each independently an optionally substituted $C_{1-30}$ alkyl group, an optionally substituted $C_{3-15}$ cycloalkyl group, or an optionally substituted $C_{6-14}$ aryl group, provided that when $A^+$ is a hydrogen ion ($H^+$), a total carbon number of R and R' is not less than 20, and a content of the compound represented by the aforementioned formula (4) with respect to 1 mol of the compound represented by the aforementioned formula (1) is not less than 2 mol, and when $A^+$ is a cation represented by the formula (2) or a cation represented by the formula (3), a total carbon number of R and R' is not less than 8.

[2] The composition of the aforementioned [1], wherein R and R' are each independently a $C_{1-30}$ alkyl group or an optionally substituted $C_{6-14}$ aryl group, and the total carbon number of R and R' is not less than 25 when $A^+$ is a hydrogen ion ($H^+$), not less than 8 when $A^+$ is a cation represented by the formula (2) or a cation represented by the formula (3).

[3] The composition of the aforementioned [1] or [2], wherein $R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 9-phenanthryl group, or a 3-phenanthryl group, each of which is substituted by one or more fluorine atoms or trifluoromethyl groups.

[4] The composition of the aforementioned [1] or [2], wherein all of $R^1$, $R^2$, $R^3$ and $R^4$ are pentafluorophenyl groups, 2,2',3,3',4',5,5',6,6'-nonafluoro-4-(1,1'-biphenylyl) groups, 2,3,4,5,6,7,8-heptafluoro-1-naphthyl groups, or 1,3,4,5,6,7,8-heptafluoro-2-naphthyl groups.

[5] The composition of any of the aforementioned [1] to [4], wherein $A^+$ is a hydrogen ion.

[6] The composition of any of the aforementioned [1] to [4], wherein $A^+$ is a cation having a total carbon number of not less than 35 and represented by the aforementioned formula (2), and $R^5$, $R^6$ and $R^7$ are each independently a $C_{1-30}$ alkyl group, or a $C_{6-14}$ aryl group optionally substituted by substituent(s) selected from the group consisting of (1) a halogen atom,
(2) a $C_{1-30}$ alkyl group,
(3) a $C_{1-30}$ alkoxy group, and
(4) a halo $C_{1-30}$ alkyl group.

[7] The composition of any of the aforementioned [1] to [4], wherein $A^+$ is a cation having a total carbon number of not less than 35 and represented by the aforementioned formula (2), $R^5$ is a $C_{6-14}$ aryl group optionally substituted by substituent(s) selected from the group consisting of (1) a halogen atom,
(2) a $C_{1-30}$ alkyl group,
(3) a $C_{1-30}$ alkoxy group, and
(4) a halo $C_{1-6}$ alkyl group, and $R^6$ and $R^7$ are each independently an optionally substituted $C_{1-30}$ alkyl group.

[8] The composition of any of the aforementioned [1] to [4], wherein $A^+$ is a cation having a total carbon number of not less than 35 and represented by the aforementioned formula (2), $R^5$ is a $C_{1-30}$ alkyl group substituted by a $C_{6-14}$ aryl group substituted by one or more fluorine atoms, or a $C_{1-30}$ alkyl group substituted by one or more fluorine atoms, and $R^6$ and $R^7$ are each independently a $C_{1-30}$ alkyl group optionally substituted by substituent(s) selected from the group consisting of (1) a $C_{6-14}$ aryl group optionally substituted by halogen atom(s),
(2) a halogen atom, and
(3) a $C_{1-30}$ alkoxy group.

[9] The composition of any of the aforementioned [1] to [4], wherein $A^+$ is a cation having a total carbon number of not less than 35 and represented by the aforementioned formula (2), $R^5$ is a fluoro $C_{1-6}$ alkyl group, and $R^6$ and $R^7$ are each independently a $C_{1-30}$ alkyl group optionally substituted by substituent(s) selected from the group consisting of (1) a $C_{6-14}$ aryl group optionally substituted by halogen atom(s),
(2) a halogen atom, and
(3) a $C_{1-30}$ alkoxy group.

[10] The composition of any of the aforementioned [1] to [4], wherein $A^+$ is a cation having a total carbon number of not less than 35 and represented by the aforementioned formula (3), and $Ar^1$, $Ar^2$ and $Ar^3$ are each independently a phenyl group optionally substituted by a $C_{1-30}$ alkyl group or a $C_{1-30}$ alkoxy group.

[11] The composition of any of the aforementioned [1] to [4], wherein $A^+$ is a hydrogen ion, and R and R' are each independently a $C_{1-30}$ alkyl group optionally substituted by substituent(s) selected from the group consisting of (1) a halogen atom,
(2) a $C_{1-30}$ alkoxy group, and
(3) a halo $C_{1-30}$ alkoxy group;

a $C_{3-15}$ cycloalkyl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group; or a $C_{6-14}$ aryl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group.

[12] The composition of any of the aforementioned [1] to [4], wherein $A^+$ is a hydrogen ion, and R and R' are each independently a $C_{1-30}$ alkyl group.

[13] The composition of any of the aforementioned [1] to [4], wherein $A^+$ is a hydrogen ion, R and R' are each independently a $C_{14-30}$ alkyl group, and the total carbon number of R and R' is not less than 28.

[14] The composition of any of the aforementioned [1] to [4], wherein $A^+$ is a hydrogen ion, and R and R' are the same group.

[15] The composition of any of the aforementioned [1] to [4] and [6] to [10], wherein $A^+$ is a cation represented by the aforementioned formula (2) or the formula (3), R and R' are each independently a $C_{1-30}$ alkyl group, and the total carbon number of R and R' is not less than 8.

[16] The composition of any of the aforementioned [1] to [4], [6] to [10], and [15], wherein a content of the compound represented by the aforementioned formula (4) with respect to 1 mol of the compound represented by the aforementioned formula (1) (wherein $A^+$ is a cation represented by the aforementioned formula (2) or the formula (3)) is within the range of 0.01-10 mol.

[17] The composition of any of the aforementioned [1] to [4], [6] to [10], and [15], wherein a content of the compound represented by the aforementioned formula (4) with respect to 1 mol of the compound represented by the aforementioned formula (1) (wherein $A^+$ is a cation represented by the aforementioned formula (2) or the formula (3)) is within the range of 0.01-3 mol.

[18] The composition of any of the aforementioned [1] to [17], having a solubility of not less than 5 wt % in n-hexane, isohexane, n-heptane, n-octane, cyclohexane, methylcyclohexane, or a mixed solvent thereof at 25° C.

[19] The composition of any of the aforementioned [1] to [18], substantially free of an ether having a total carbon number of not more than 7.

[20] A cocatalyst for polymerization of at least one kind of monomer selected from the group consisting of an olefin and a diene, consisting of the composition of any of the aforementioned [1] to [19].

[21] A method for producing a polymer, comprising polymerizing at least one kind of monomer selected from the group consisting of an olefin and a diene by using the composition of any of the aforementioned [1] to [19] as a cocatalyst.

[22] A composition comprising a compound represented by the following formula (1) and a compound represented by the following formula (4):

(1)

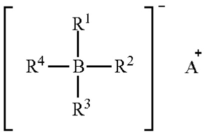

-continued (4)

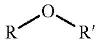

wherein $R^1$, $R^2$, $R^3$ and $R^4$ are each independently a $C_{6-14}$ aryl group substituted by one or more fluorine atoms or one or more fluoro $C_{1-4}$ alkyl groups, $A^+$ is a hydrogen ion ($H^+$), R and R' are each independently an optionally substituted $C_{1-30}$ alkyl group, an optionally substituted $C_{3-15}$ cycloalkyl group, or an optionally substituted $C_{6-14}$ aryl group, a total carbon number of R and R' is not less than 20, and a content of the compound represented by the aforementioned formula (4) with respect to 1 mol of the compound represented by the aforementioned formula (1) is not less than 2 mol, comprising a step of reacting a compound represented by the following formula (5):

(5)

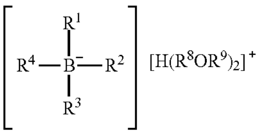

wherein $R^1$, $R^2$, $R^3$ and $R^4$ are as defined above, $R^8$ and $R^9$ are each independently a $C_{1-6}$ alkyl group, and a total carbon number of $R^8OR^9$ is not more than 7, with a compound represented by the following formula (4):

(4)

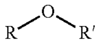

wherein R and R' are as defined above.

[23] The production method of the aforementioned [22], wherein both $R^8$ and $R^9$ are ethyl groups.

Effect of the Invention

According to the present invention, a composition containing a borate compound which is soluble in hydrocarbon solvents, particularly aliphatic hydrocarbon solvents, and useful as a cocatalyst, and a production method thereof can be provided.

DESCRIPTION OF EMBODIMENTS

The definitions of the terms and respective symbols used in the present specification are explained below.

In the present specification, the "halogen atom" means a fluorine atom, a chlorine atom, a bromine atom, or an iodine atom.

In the present specification, the "alkyl (group)" means a linear or branched chain alkyl group having a carbon number of not less than 1.

In the present specification, the "$C_{1-30}$ alkyl (group)" means a linear or branched chain alkyl group having a carbon number of 1 to 30. Examples thereof include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, 2-ethylbutyl, heptyl, octyl, nonyl, decyl, undecyl, dodecyl, tridecyl, tetradecyl, hexadecyl, octadecyl, nonadecyl, eicosyl, docosyl, tricosyl, tetracosyl, pentacosyl, hexacosyl, heptacosyl, octacosyl, nonacosyl, triacontyl, and the like.

In the present specification, the "$C_{4-30}$ alkyl (group)" means a linear or branched chain alkyl group having a carbon number of 4 to 30. Examples thereof include butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, 2-ethylbutyl, heptyl, octyl, nonyl, decyl, undecyl, dodecyl, tridecyl, tetradecyl, hexadecyl, octadecyl, nonadecyl, eicosyl, docosyl, tricosyl, tetracosyl, pentacosyl, hexacosyl, heptacosyl, octacosyl, nonacosyl, triacontyl, and the like.

In the present specification, the "$C_{14-30}$ alkyl (group)" means a linear or branched chain alkyl group having a carbon number of 14 to 30. Examples thereof include tetradecyl, hexadecyl, octadecyl, nonadecyl, eicosyl, docosyl, tricosyl, tetracosyl, pentacosyl, hexacosyl, heptacosyl, octacosyl, nonacosyl, triacontyl, and the like.

In the present specification, the "$C_{1-6}$ alkyl (group)" means a linear or branched chain alkyl group having a carbon number of 1 to 6. Examples thereof include methyl, ethyl, propyl, isopropyl, butyl, isobutyl, sec-butyl, tert-butyl, pentyl, isopentyl, neopentyl, 1-ethylpropyl, hexyl, isohexyl, 1,1-dimethylbutyl, 2,2-dimethylbutyl, 3,3-dimethylbutyl, 2-ethylbutyl, and the like. Among them, $C_{1-4}$ alkyl group is preferred.

In the present specification, the "halo $C_{1-30}$ alkyl (group)" means the aforementioned "$C_{1-30}$ alkyl" group in which one or more hydrogen atoms are substituted by halogen atom(s). Specific examples thereof include difluoromethyl, trifluoromethyl, 2-chloroethyl, 2-bromoethyl, 2-iodoethyl, 2-fluoroethyl, 2,2-difluoroethyl, 2,2,2-trifluoroethyl, pentafluoroethyl, 2,2-difluoropropyl, 2,2,3,3-tetrafluoropropyl, 3,3,3-trifluoropropyl, 2,2,3,3,3-pentafluoropropyl, 2,2-difluorobutyl, 4,4,4-trifluorobutyl, 2,2-difluoropentyl, 5,5,5-trifluoropentyl, 2,2-difluorohexyl, 6,6,6-trifluorohexyl, and the like. Among them, "halo $C_{1-6}$ alkyl" in which one or more hydrogen atoms in the aforementioned "$C_{1-6}$ alkyl" group are substituted by halogen atom(s) is preferred.

In the present specification, the "fluoro $C_{1-6}$ alkyl (group)" means the aforementioned "halo $C_{1-6}$ alkyl" group in which the halogen atom is a fluorine atom. Specific examples thereof include difluoromethyl, trifluoromethyl, 2-fluoroethyl, 2,2-difluoroethyl, 2,2,2-trifluoroethyl, pentafluoroethyl, 2,2-difluoropropyl, 2,2,3,3-tetrafluoropropyl, 3,3,3-trifluoropropyl, 2,2,3,3,3-pentafluoropropyl, 2,2-difluorobutyl, 4,4,4-trifluorobutyl, 2,2-difluoropentyl, 5,5,5-trifluoropentyl, 2,2-difluorohexyl, 6,6,6-trifluorohexyl, and the like. Among them, "fluoro $C_{1-4}$ alkyl (groups)" such as difluoromethyl, trifluoromethyl, 2,2,2-trifluoroethyl, pentafluoroethyl, 2,2-difluoropropyl, 2,2,3,3-tetrafluoropropyl, 3,3,3-trifluoropropyl, 2,2,3,3,3-pentafluoropropyl, 2,2-difluorobutyl, 4,4,4-trifluorobutyl, and the like are preferred, and difluoromethyl, trifluoromethyl, 2,2,2-trifluoroethyl, pentafluoroethyl, and 2,2-difluoropropyl are more preferred, and trifluoromethyl and 2,2,2-trifluoroethyl are particularly preferred.

In the present specification, the "cycloalkyl (group)" means a cyclic alkyl group. Unless the carbon number range is particularly limited, it is preferably a $C_{3-15}$ cycloalkyl group, more preferably a $C_{3-8}$ cycloalkyl group.

In the present specification, the "$C_{3-15}$ cycloalkyl (group)" means a cyclic alkyl group having a carbon number of 3 to 15. Examples thereof include cyclopropyl, cyclobutyl, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, and the like. The "$C_{3-8}$ cycloalkyl (group)" means a cyclic alkyl group having a carbon number of 3 to 8. Examples thereof include cyclopropyl, cyclobutyl, cyclopentyl, cyclohexyl, cycloheptyl, cyclooctyl, and the like. Among them, a $C_{3-6}$ cycloalkyl group is preferred.

In the present specification, the "alkoxy (group)" means a group in which a linear or branched chain alkyl group is bonded to an oxygen atom.

In the present specification, the "$C_{1-30}$ alkoxy (group)" means a linear or branched chain alkoxy group having a carbon number of 1 to 30. Examples thereof include methoxy, ethoxy, propoxy, isopropoxy, butoxy, isobutoxy, sec-butoxy, tert-butoxy, pentyloxy, isopentyloxy, neopentyloxy, hexyloxy, isohexyloxy, 1,1-dimethylbutoxy, 2,2-dimethylbutoxy, 3,3-dimethylbutoxy, 2-ethylbutoxy, heptyloxy, octyloxy, nonyloxy, decyloxy, undecyloxy, dodecyloxy, tridecyloxy, tetradecyloxy, hexadecyloxy, octadecyloxy, eicosyloxy, docosyloxy, tricosyloxy, tetracosyloxy, pentacosyloxy, hexacosyloxy, heptacosyloxy, octacosyloxy, nonacosyloxy, triacontyloxy, and the like.

In the present specification, the "$C_{4-30}$ alkoxy (group)" means a linear or branched chain alkoxy group having a carbon number of 4 to 30. Examples thereof include butoxy, isobutoxy, sec-butoxy, tert-butoxy, pentyloxy, isopentyloxy, neopentyloxy, hexyloxy, isohexyloxy, 1,1-dimethylbutoxy, 2,2-dimethylbutoxy, 3,3-dimethylbutoxy, 2-ethylbutoxy, heptyloxy, octyloxy, nonyloxy, decyloxy, undecyloxy, dodecyloxy, tridecyloxy, tetradecyloxy, hexadecyloxy, octadecyloxy, eicosyloxy, docosyloxy, tricosyloxy, tetracosyloxy, pentacosyloxy, hexacosyloxy, heptacosyloxy, octacosyloxy, nonacosyloxy, triacontyloxy, and the like.

In the present specification, the "$C_{14-30}$ alkoxy (group)" means a linear or branched chain alkoxy group having a carbon number of 14 to 30. Examples thereof include tetradecyloxy, hexadecyloxy, octadecyloxy, eicosyloxy, docosyloxy, tricosyloxy, tetracosyloxy, pentacosyloxy, hexacosyloxy, heptacosyloxy, octacosyloxy, nonacosyloxy, triacontyloxy, and the like.

In the present specification, the "$C_{1-6}$ alkoxy (group)" means a linear or branched chain alkoxy group having a carbon number of 1 to 6. Examples thereof include methoxy, ethoxy, propoxy, isopropoxy, butoxy, isobutoxy, sec-butoxy, tert-butoxy, pentyloxy, isopentyloxy, neopentyloxy, hexyloxy, and the like. Among them, a $C_{1-4}$ alkoxy group is preferred.

In the present specification, the "halo $C_{1-30}$ alkoxy (group)" means the aforementioned "$C_{1-30}$ alkoxy" group in which one or more hydrogen atoms are substituted by halogen atom(s). Specific examples thereof include difluoromethoxy, trifluoromethoxy, 2-chloroethoxy, 2-bromoethoxy, 2-iodoethoxy, 2-fluoroethoxy, 2,2-difluoroethoxy, 2,2,2-trifluoroethoxy, pentafluoroethoxy, 2,2-difluoropropoxy, 2,2,3,3-tetrafluoropropoxy, 3,3,3-trifluoropropoxy, 2,2,3,3,3-pentafluoropropoxy, 2,2-difluorobutoxy, 4,4,4-trifluorobutoxy, 2,2-difluoropentyloxy, 5,5,5-trifluoropentyloxy, 2,2-difluorohexyloxy, 6,6,6-trifluorohexyloxy, and the like. Among them, "halo $C_{1-6}$ alkoxy" in which one or more hydrogen atoms in the aforementioned "$C_{1-6}$ alkoxy" group are substituted by halogen atom(s) is preferred.

In the present specification, the "fluoro $C_{1-6}$ alkoxy (group)" means the aforementioned "halo $C_{1-6}$ alkoxy" group in which the halogen atom is a fluorine atom. Specific examples thereof include difluoromethoxy, trifluoromethoxy, 2-fluoroethoxy, 2,2-difluoroethoxy, 2,2,2-trifluoroethoxy, pentafluoroethoxy, 2,2-difluoropropoxy, 2,2,3,3-tetrafluoropropoxy, 3,3,3-trifluoropropoxy, 2,2,3,3,3-pentafluoropropoxy, 2,2-difluorobutoxy, 4,4,4-trifluorobutoxy, 2,2-difluoropentyloxy, 5,5,5-trifluoropentyloxy, 2,2-difluorohexyloxy, 6,6,6-trifluorohexyloxy, and the like. Among them, "fluoro $C_{1-4}$ alkoxy (groups)" such as difluoromethoxy, trifluoromethoxy, 2,2,2-trifluoroethoxy, pentafluoroethoxy, pentafluoroethoxy, 2,2-difluoropropoxy, 2,2,3,3-tetrafluoropropoxy, 3,3,3-trifluoropropoxy, 2,2,3,3,3-pentafluoropropoxy, 2,2-difluorobutoxy, 4,4,4-trifluorobutoxy, and the like are preferred; difluoromethoxy, trifluoromethoxy, 2,2,2-trifluoroethoxy, pentafluoroethoxy, and 2,2-difluoropropoxy are more preferred; and trifluoromethoxy and 2,2,2-trifluoroethoxy are particularly preferred.

In the present specification, the "aryl (group)" mean a monocyclic or polycyclic (fused) hydrocarbon group showing aromaticity. Specific examples thereof include $C_{6-14}$ aryl groups such as phenyl, 1-naphthyl, 2-naphthyl, 2-biphenylyl, 3-biphenylyl, 4-biphenylyl, 1-anthryl, 2-anthryl, 9-anthryl, 3-phenanthryl, 9-phenanthryl, and the like. Among them, phenyl, 4-biphenylyl, 1-naphthyl, and 2-naphthyl are preferred.

In the present specification, the "nitrogen-containing aromatic heterocyclic compound" means a monocyclic or fused polycyclic aromatic heterocyclic compound containing, besides a carbon atom, 1 to 4 hetero atoms selected from a nitrogen atom, a sulfur atom, and an oxygen atom as ring-constituting atom(s), and containing at least one nitrogen atom as the ring-constituting atom.

Preferable examples of the "nitrogen-containing aromatic heterocyclic compound" include 5- or 6-membered monocyclic nitrogen-containing aromatic heterocyclic compounds such as pyrrole, imidazole, pyrazole, thiazole, isothiazole, oxazole, isoxazole, pyridine, pyrazine, pyrimidine, pyridazine, 1,2,4-oxadiazole, 1,3,4-oxadiazole, 1,2,4-thiadiazole, 1,3,4-thiadiazole, triazole, tetrazole, triazine, and the like; 8- to 14-membered fused polycyclic (preferably bi- or tri-cyclic) nitrogen-containing aromatic heterocyclic compounds such as benzimidazole, benzoxazole, benzisoxazole, benzothiazole, benzisothiazole, benzotriazole, imidazopyridine, thienopyridine, furopyridine, pyrrolopyridine, pyrazolopyridine, oxazolopyridine, thiazolopyridine, imidazopyrazine, imidazopyrimidine, thienopyrimidine, furopyrimidine, pyrrolopyrimidine, pyrazolopyrimidine, oxazolopyrimidine, thiazolopyrimidine, pyrazolotriazine, indole, isoindole, 1H-indazole, purine, isoquinoline, quinoline, phthalazine, naphthyridine, quinoxaline, quinazoline, cinnoline, carbazole, β-carboline, phenanthridine, acridine, phenazine, phenothiazine, phenoxathiine, and the like. Among them, 5- or 6-membered monocyclic nitrogen-containing aromatic heterocyclic compound is preferred, and pyridine and imidazole are more preferred.

In the present specification, the "optionally substituted" means unsubstituted or having one or more substituents. Unless otherwise particularly indicated, (1) a halogen atom, (2) a nitro group, (3) a cyano group, (4) a $C_{1-30}$ alkyl group, (5) a halo $C_{1-30}$ alkyl group, (6) a $C_{3-8}$ cycloalkyl group, (7) a $C_{1-30}$ alkoxy group, (8) a halo $C_{1-30}$ alkoxy group, (9) a $C_{6-14}$ aryl group, and the like can be mentioned as the "substituent". Among them, a halogen atom, a cyano group, a $C_{1-6}$ alkyl group, a halo $C_{1-6}$ alkyl group, a $C_{1-6}$ alkoxy group, a halo $C_{1-6}$ alkoxy group, and a phenyl group are preferred, and a halogen atom (e.g., fluorine atom), a $C_{1-6}$ alkyl group (e.g., methyl, ethyl), a $C_{1-6}$ alkoxy group (e.g., methoxy, ethoxy), and a halo $C_{1-6}$ alkyl group (e.g., trifluoromethyl) are more preferred. When plural substituents are present, respective substituents may be the same or different. The above-mentioned substituents may also be further substituted by one or more of a $C_{1-6}$ alkyl group, a $C_{1-6}$ alkoxy group, a halogen atom, a phenyl group, and the like.

In the present specification, the "hydrocarbon solvent" means solvents including aromatic hydrocarbon solvents and/or aliphatic hydrocarbon solvents. Among them, aliphatic hydrocarbon solvents are preferable from the aspects of odor and toxicity.

In the present specification, examples of the "aromatic hydrocarbon solvent" include benzene, toluene, xylene, and the like.

In the present specification, examples of the "aliphatic hydrocarbon solvent" include n-hexane, isohexane, n-heptane, n-octane, cyclohexane, methylcyclohexane, a mixed solvent thereof, and the like.

In the present specification, the "soluble in hydrocarbon solvent (or aliphatic hydrocarbon solvent)" means that the composition of the present invention is dissolved in a solution of a hydrocarbon solvent (or aliphatic hydrocarbon solvent) and the composition of the present invention at 25° C. at a concentration of not less than 5 wt % to form a transparent homogeneous solution. In addition, the "easily soluble in hydrocarbon solvent (or aliphatic hydrocarbon solvent)" means that the composition of the present invention is dissolved in a solution of a hydrocarbon solvent (or aliphatic hydrocarbon solvent) and the composition of the present invention at 25° C. at a concentration of not less than 20 wt % (preferably not less than 30 wt %) to form a transparent homogeneous solution.

Composition of the Present Invention

The composition of the present invention is explained below.

The composition of the present invention is a composition containing a compound represented by the following formula (1) and a compound represented by the following formula (4):

(1)

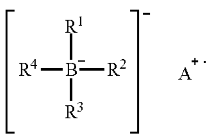

(4)

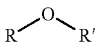

wherein $R^1$, $R^2$, $R^3$ and $R^4$ are each independently a $C_{6-14}$ aryl group substituted by one or more fluorine atoms or one or more fluoro $C_{1-4}$ alkyl groups, $A^+$ is a hydrogen ion ($H^+$), a cation having a total carbon number of not less than 25 and represented by the formula (2):

(2)

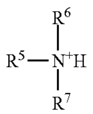

wherein $R^5$, $R^6$ and $R^7$ are each independently an optionally substituted $C_{1-30}$ alkyl group, or an optionally substituted $C_{6-14}$ aryl group, or a cation having a total carbon number of not less than 25 and represented by the formula (3):

(3)

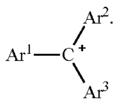

wherein $Ar^1$, $Ar^2$ and $Ar^3$ are each independently a $C_{6-14}$ aryl group optionally substituted by one or more $C_{1-30}$ alkyl groups or $C_{1-30}$ alkoxy groups, and R and R' are each independently an optionally substituted $C_{1-30}$ alkyl group, an optionally substituted $C_{3-15}$ cycloalkyl group, or an optionally substituted $C_{6-14}$ aryl group, provided that when $A^+$ is a hydrogen ion ($H^+$), a total carbon number of R and R' is not less than 20, and a content of the compound represented by the aforementioned formula (4) with respect to 1 mol of the compound represented by the aforementioned formula (1) is not less than 2 mol, and when $A^+$ is a cation represented by the formula (2) or a cation represented by the formula (3), a total carbon number of R and R' is not less than 8.

The composition containing a compound represented by the aforementioned formula (1) and a compound represented by the aforementioned formula (4) is not particularly limited as long as it contains the both compounds, and may include a compound in which the compound represented by the aforementioned formula (4) is coordinated with the compound represented by the aforementioned formula (1) to form a complex. The composition of the present invention is preferably a composition containing a complex formed by a compound represented by the aforementioned formula (1) and a compound represented by the aforementioned formula (4).

Preferred embodiments of the compound represented by the formula (1) (hereinafter to be also referred to as "compound (1)") are explained below.

Each group of compound (1) is explained below.

$R^1$, $R^2$, $R^3$ and $R^4$ are preferably each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group, each substituted by one or more fluorine atoms or one or more fluoro $C_{1-4}$ alkyl groups (e.g., trifluoromethyl group), more preferably each independently a phenyl group, a 1-naphthyl group, a 2-naphthyl group, or a 4-biphenylyl group, each substituted by one or more fluorine atoms or one or more trifluoromethyl groups, particularly preferably a pentafluorophenyl group, a 2,2',3,3',4',5,5',6,6'-nonafluoro-4-(1,1'-biphenylyl) group, a 2,3,4,5,6,7,8-heptafluoro-1-naphthyl group, or a 1,3,4,5,6,7,8-heptafluoro-2-naphthyl group, wherein all of $R^1$, $R^2$, $R^3$ and $R^4$ are the same.

$A^+$ is preferably a hydrogen ion ($H^+$).

Another preferred embodiment of $A^+$ is a cation having a total carbon number of not less than 25, preferably a cation having a total carbon number of not less than 35, and represented by the aforementioned formula (2).

$R^5$, $R^6$ and $R^7$ in the formula (2) are preferably each independently a $C_{1-30}$ alkyl group, or a $C_{6-14}$ aryl group optionally substituted by substituent(s) selected from the group consisting of (1) a halogen atom,
(2) a $C_{1-30}$ alkyl group,
(3) a $C_{1-30}$ alkoxy group, and
(4) a halo $C_{1-30}$ alkyl group,
more preferably, $R^5$ is a $C_{6-14}$ aryl group optionally substituted by substituent(s) selected from the group consisting of
(1) a halogen atom,
(2) a $C_{1-30}$ alkyl group,
(3) a $C_{1-30}$ alkoxy group and
(4) a halo $C_{1-30}$ alkyl group, and
$R^6$ and $R^7$ are each independently an optionally substituted $C_{1-30}$ alkyl group.

Another preferred embodiment of $A^+$ is a cation having a total carbon number of not less than 35 and represented by the aforementioned formula (2), wherein $R^5$ in the aforementioned formula (2) is a $C_{1-30}$ alkyl group substituted by a $C_{6-14}$ aryl group substituted by one or more fluorine atoms, or a $C_{1-30}$ alkyl group substituted by one or more fluorine atoms, and $R^6$ and $R^7$ are each independently a $C_{1-30}$ alkyl group optionally substituted by substituent(s) selected from the group consisting of
(1) a $C_{6-14}$ aryl group optionally substituted by halogen atom(s),
(2) a halogen atom, and
(3) a $C_{1-30}$ alkoxy group,
more preferably, $R^5$ is a fluoro $C_{1-6}$ alkyl group, and $R^6$ and $R^7$ are each independently a $C_{1-30}$ alkyl group optionally substituted by substituent(s) selected from the group consisting of
(1) a $C_{6-14}$ aryl group optionally substituted by halogen atom(s),
(2) a halogen atom, and
(3) a $C_{1-30}$ alkoxy group.

A yet another preferred embodiment of $A^+$ is a cation having a total carbon number of not less than 35 and represented by the aforementioned formula (3), preferably, $Ar^1$, $Ar^2$ and $Ar^3$ in the formula (3) are each independently a phenyl group optionally substituted by a $C_{1-30}$ alkyl group or a $C_{1-30}$ alkoxy group, more preferably, $Ar^1$, $Ar^2$ and $Ar^3$ are each independently a phenyl group optionally substituted by a $C_{4-30}$ alkyl group.

As preferred compound (1), the following compounds can be mentioned.

[Compound (1-1)]

Compound (1) of the aforementioned formula (1), wherein
$R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group, substituted by one or more fluorine atoms or fluoro $C_{1-4}$ alkyl groups (e.g., trifluoromethyl group), and
$A^+$ is a hydrogen ion ($H^+$).

[Compound (1-2-A)]

Compound (1) of the aforementioned formula (1), wherein
$R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group, each substituted by one or more fluorine atoms or one or more fluoro $C_{1-4}$ alkyl groups (e.g., trifluoromethyl group), and
$A^+$ is a cation having a total carbon number of not less than 25 and represented by the aforementioned formula (2), and $R^5$, $R^6$ and $R^7$ in the formula (2) are each independently a $C_{1-30}$ alkyl group or a $C_{6-14}$ aryl group optionally substituted by substituent(s) selected from the group consisting of
(1) a halogen atom,
(2) a $C_{1-30}$ alkyl group,
(3) a $C_{1-30}$ alkoxy group and
(4) a halo $C_{1-30}$ alkyl group.

[Compound (1-2)]

Compound (1) of the aforementioned formula (1), wherein
$R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group, each substituted by one or more fluorine atoms or one or more fluoro $C_{1-4}$ alkyl groups (e.g., trifluoromethyl group), and
$A^+$ is a cation having a total carbon number of not less than 35 and represented by the aforementioned formula (2), and $R^5$, $R^6$ and $R^7$ in the formula (2) are each independently a $C_{1-30}$ alkyl group, or a $C_{6-14}$ aryl group optionally substituted by substituent(s) selected from the group consisting of
(1) a halogen atom,
(2) a $C_{1-30}$ alkyl group,
(3) a $C_{1-30}$ alkoxy group, and
(4) a halo $C_{1-30}$ alkyl group.

[Compound (1-2-B)]

Compound (1) of the aforementioned formula (1), wherein
$R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group (preferably, a phenyl group, a 1-naphthyl group, a 2-naphthyl group, or a 4-biphenylyl group), each substituted by one or more fluorine atoms or one or more fluoro $C_{1-4}$ alkyl groups (e.g., trifluoromethyl group),
$A^+$ is a cation having a total carbon number of not less than 25 (preferably not less than 35) and represented by the aforementioned formula (2),
$R^5$ in the formula (2) is a $C_{6-14}$ aryl group optionally substituted by substituent(s) selected from the group consisting of
(1) a halogen atom,
(2) a $C_{1-30}$ alkyl group,
(3) a $C_{1-30}$ alkoxy group, and
(4) a halo $C_{1-30}$ alkyl group, and
$R^6$ and $R^7$ are each independently an optionally substituted $C_{1-30}$ alkyl group.

[Compound (1-2-C)]

Compound (1) of the aforementioned formula (1), wherein
$R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group (preferably, a phenyl group, a 1-naphthyl group, a 2-naphthyl group, or a 4-biphenylyl group), each substituted by one or more fluorine atoms or one or more fluoro $C_{1-4}$ alkyl groups (e.g., trifluoromethyl group), $A^+$ is a cation having a total carbon number of not less than 25 (preferably not less than 35) and represented by the aforementioned formula (2), $R^5$ in the formula (2) is a $C_{1-30}$ alkyl group substituted by a $C_{6-14}$ aryl group substituted by one or more fluorine atoms, or a $C_{1-30}$ alkyl group substituted by one or more fluorine atoms, and $R^6$ and $R^7$ are each independently a $C_{1-30}$ alkyl group optionally substituted by substituent(s) selected from the group consisting of (1) a $C_{6-14}$ aryl group optionally substituted by halogen atom(s), (2) a halogen atom, and (3) a $C_{1-30}$ alkoxy group.

[Compound (1-2-D)]

Compound (1) of the aforementioned formula (1), wherein $R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group (preferably a phenyl group, a 1-naphthyl group, a 2-naphthyl group, or a 4-biphenylyl group), each substituted by one or more fluorine atoms or one or more fluoro $C_{1-4}$ alkyl groups (e.g., trifluoromethyl group), $A^+$ is a cation having a total carbon number of not less than 25 (preferably not less than 35) and represented by the aforementioned formula (2), $R^5$ in the formula (2) is a fluoro $C_{1-6}$ alkyl group, and $R^6$ and $R^7$ are each independently a $C_{1-30}$ alkyl group optionally substituted by substituent(s) selected from the group consisting of (1) a $C_{6-14}$ aryl group optionally substituted by halogen atom(s), (2) a halogen atom, and (3) a $C_{1-30}$ alkoxy group.

[Compound (1-3)]

Compound (1) of the aforementioned formula (1), wherein $R^1$, $R^2$, $R^3$ and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 3-phenanthryl group, or a 9-phenanthryl group, each substituted by one or more fluorine atoms or one or more fluoro $C_{1-4}$ alkyl groups (e.g., trifluoromethyl group), $A^+$ is a cation having a total carbon number of not less than 35 and represented by the aforementioned formula (3), and Art, $Ar^2$ and $Ar^3$ in the formula (3) are each independently a cation which is a phenyl group optionally substituted by a $C_{1-30}$ alkyl group or a $C_{1-30}$ alkoxy group.

[Compound (1-4)]

Compound (1) of the aforementioned formula (1), wherein $R^1$, $R^2$, $R^3$ and $R^4$ are each independently a phenyl group, a 1-naphthyl group, a 2-naphthyl group, or a 4-biphenylyl group, each substituted by one or more fluorine atoms or one or more trifluoromethyl groups, and $A^+$ is a hydrogen ion ($H^+$).

[Compound (1-5)]

Compound (1) of the aforementioned formula (1), wherein $R^1$, $R^2$, $R^3$ and $R^4$ are each independently a phenyl group, a 1-naphthyl group, a 2-naphthyl group, or a 4-biphenylyl group, each substituted by one or more fluorine atoms or one or more trifluoromethyl groups, $A^+$ is a cation having a total carbon number of not less than 35 and represented by the aforementioned formula (2), and any one of $R^5$, $R^6$ and $R^7$ in the formula (2) is a phenyl group optionally substituted by substituent(s) selected from the group consisting of (1) a halogen atom, (2) a $C_{1-30}$ alkyl group, (3) a $C_{1-30}$ alkoxy group, and (4) a halo $C_{1-30}$ alkyl group, and the other two are $C_{1-30}$ alkyl groups (preferably $C_{14-30}$ alkyl groups).

[Compound (1-6)]

Compound (1) of the aforementioned formula (1), wherein $R^1$, $R^2$, $R^3$ and $R^4$ are each independently a phenyl group, a 1-naphthyl group, a 2-naphthyl group, or a 4-biphenylyl group, each substituted by one or more fluorine atoms or one or more trifluoromethyl groups, $A^+$ is a cation having a total carbon number of not less than 35 and represented by the aforementioned formula (3), and $Ar^1$, $Ar^2$ and $Ar^3$ in the formula (3) are each independently a phenyl group optionally substituted by a $C_{4-30}$ alkyl group.

[Compound (1-7)]

Compound (1) of the aforementioned formula (1), wherein $R^1$, $R^2$, $R^3$ and $R^4$ are all the same and are pentafluorophenyl groups, 2,2',3,3',4',5,5',6,6'-nonafluoro-4-(1,1'-biphenylyl) groups, 2,3,4,5,6,7,8-heptafluoro-1-naphthyl groups, or 1,3,4,5,6,7,8-heptafluoro-2-naphthyl groups, and $A^+$ is a hydrogen ion ($H^+$).

[Compound (1-8)]

Compound (1) of the aforementioned formula (1), wherein $R^1$, $R^2$, $R^3$ and $R^4$ are all the same and are pentafluorophenyl groups, 2,2',3,3',4',5,5',6,6'-nonafluoro-4-(1,1'-biphenylyl) groups, 2,3,4,5,6,7,8-heptafluoro-1-naphthyl groups, or 1,3,4,5,6,7,8-heptafluoro-2-naphthyl groups, and $A^+$ is a cation having a total carbon number of not less than 35 and represented by the aforementioned formula (2), and any one of $R^5$, $R^6$ and $R^7$ in the formula (2) is a phenyl group optionally substituted by substituent(s) selected from the group consisting of (1) a halogen atom, (2) a $C_{1-30}$ alkyl group, (3) a $C_{1-30}$ alkoxy group, and (4) a halo $C_{1-30}$ alkyl group, and the other two are $C_{1-30}$ alkyl groups (preferably $C_{14-30}$ alkyl groups).

[Compound (1-9)]

Compound (1) of the aforementioned formula (1), wherein $R^1$, $R^2$, $R^3$ and $R^4$ are all the same and are pentafluorophenyl groups, 2,2',3,3',4',5,5',6,6'-nonafluoro-4-(1,1'-biphenylyl) groups, 2,3,4,5,6,7,8-heptafluoro-1-naphthyl groups, or 1,3,4,5,6,7,8-heptafluoro-2-naphthyl groups, and $A^+$ is a cation having a total carbon number of not less than 35 and represented by the aforementioned formula (3), and $Ar^1$, $Ar^2$ and $Ar^3$ in the formula (3) are each independently a phenyl group optionally substituted by a $C_{4-30}$ alkyl group.

Specific preferable examples of compound (1) include hydrogenated tetrakis(pentafluorophenyl)borate, hydrogenated tetrakis(heptafluoronaphthyl)borate, hydrogenated tetrakis(nonafluorobiphenyl)borate, N,N-dioctadecylmethylammonium tetrakis(pentafluorophenyl)borate, N,N-dioctadecylanilinium tetrakis(pentafluorophenyl)borate, N,N-dioctadecyl-2,2,2-trifluoroethylammonium tetrakis (pentafluorophenyl)borate, N,N-dioctadecyl-(2,3,4,5,6-pentafluorophenyl)methylammonium tetrakis(pentafluorophenyl)borate, N,N-dioctadecyl-2,2,3,3,3-pentafluoropropylammonium tetrakis(pentafluorophenyl) borate, N,N-didodecyl-2,2,2-trifluoroethylammonium tetrakis(pentafluorophenyl)borate, N,N-dioctadecyl-2,2-difluoroethylammonium tetrakis(pentafluorophenyl)borate, N,N-dioctadecyl-3,3,3-trifluoropropylammonium tetrakis (pentafluorophenyl)borate, N,N-dioctadecyl-2-fluoroethylammonium tetrakis(pentafluorophenyl)borate, N,N-didocosyl-2,2,2-trifluoroethylammonium tetrakis (pentafluorophenyl)borate, N,N-bis(3,7,11,15-tetramethylhexadecyl)-2,2,2-trifluoroethylammonium tetrakis(pentafluorophenyl)borate, N,N-bis(3,7,11-trimethyldodecyl)-2,2,2-trifluoroethylammonium tetrakis(pentafluorophenyl)borate, N,N-ditetradecyl-2,2,2-trifluoroethylammonium tetrakis(pentafluorophenyl)borate, N,N-dihexadecyl-2,2,2-trifluoroethylammonium tetrakis (pentafluorophenyl)borate, N,N-dioctadecyl-2,2,2-trifluoroethylammonium tetrakis(heptafluoronaphthyl) borate, N,N-dioctadecyl-2,2,2-trifluoroethylammonium tetrakis(nonafluorobiphenyl)borate, and the like.

A preferred embodiment of a compound represented by the formula (4) (hereinafter to be also referred to as "compound (4)") is explained in the following.

Each group of compound (4) is explained in the following.

Preferred embodiments of compound (4) vary depending on the kind of $A^+$ in compound (1).

When $A^+$ in compound (1) is a hydrogen ion ($H^+$), the total carbon number of R and R' is not less than 20, preferably not less than 25, more preferably not less than 28, further preferably not less than 30.

R and R' are each independently an optionally substituted $C_{1-30}$ alkyl group, an optionally substituted $C_{3-15}$ cycloalkyl group, or an optionally substituted $C_{6-14}$ aryl group, preferably each independently a $C_{1-30}$ alkyl group optionally substituted by substituent(s) selected from the group consisting of (1) a halogen atom,
(2) a $C_{1-30}$ alkoxy group, and
(3) a halo $C_{1-30}$ alkoxy group;

a $C_{3-15}$ cycloalkyl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group; or a $C_{6-14}$ aryl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group, further preferably each independently a $C_{14-30}$ alkyl group.

When $A^+$ in compound (1) is a cation represented by the formula (2) or a cation represented by the formula (3), the total carbon number of R and R' is preferably not less than 8, more preferably not less than 10.

R and R' are preferably each independently a $C_{1-30}$ alkyl group.

When $A^+$ in compound (1) is a hydrogen ion ($H^+$), preferred compounds (4) are, for example, the following compounds.

[Compound (4-1-A)]

Compound (4) of the aforementioned formula (4), wherein R and R' are each independently a $C_{1-30}$ alkyl group optionally substituted by substituent(s) selected from the group consisting of (1) a halogen atom,
(2) a $C_{1-30}$ alkoxy group, and
(3) a halo $C_{1-30}$ alkoxy group;

a $C_{3-15}$ cycloalkyl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group; or a $C_{6-14}$ aryl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group, and the total carbon number of R and R' is not less than 20 (preferably not less than 25).

[Compound (4-1-B)]

Compound (4) of the aforementioned formula (4), wherein R and R' are each independently a $C_{1-30}$ alkyl group, or a $C_{6-14}$ aryl group optionally substituted by substituent(s) selected from the group consisting of (1) a halogen atom,
(2) a $C_{1-30}$ alkyl group,
(3) a $C_{1-30}$ alkoxy group,
(4) a halo $C_{1-30}$ alkyl group, and
(5) a halo $C_{1-30}$ alkoxy group, and the total carbon number of R and R' is not less than 20 (preferably not less than 25).

[Compound (4-1-C)]

Compound (4) of the aforementioned formula (4), wherein R and R' are each independently a $C_{1-30}$ alkyl group, and the total carbon number of R and R' is not less than 20 (preferably not less than 25).

[Compound (4-1)]

Compound (4) of the aforementioned formula (4), wherein R and R' are each independently a $C_{14-30}$ alkyl group, and the total carbon number of R and R' is not less than 28.

Specific preferable examples of compound (4) when $A^+$ in compound (1) is a hydrogen ion ($H^+$) include didecyl ether, didodecyl ether, ditetradecyl ether, dihexadecyl ether, dioctadecyl ether, docosyl ethyl ether, tetradecyloxyethyl tetradecyl ether, and the like.

As preferable compound (4) when $A^+$ in compound (1) is a cation represented by the formula (2) or a cation represented by the formula (3), the following compounds can be mentioned.

[Compound (4-2)]

Compound (4) of the aforementioned formula (4), wherein R and R' are each independently a $C_{1-30}$ alkyl group, and the total carbon number of R and R' is not less than 8.

[Compound (4-3)]

Compound (4) of the aforementioned formula (4), wherein R and R' are each independently a $C_{1-30}$ alkyl group, and the total carbon number of R and R' is not less than 10.

Specific preferable examples of compound (4) when $A^+$ in compound (1) is a cation represented by the formula (2) or a cation represented by the formula (3) include dibutyl ether, dihexyl ether, dioctyl ether, didecyl ether, didodecyl ether, ditetradecyl ether, dihexadecyl ether, dioctadecyl ether, cyclopentyl methyl ether, diphenyl ether, octadecyl phenyl ether, and the like. Among them, didodecyl ether, ditetradecyl ether, dihexadecyl ether, and dioctadecyl ether are preferred.

When the total carbon number of R and R' groups in compound (4) is not more than 7, it is feared that industrial control of the content thereof is difficult due to the low boiling point.

Specific examples of the preferable combination of compound (1) and compound (4) contained in the composition of the present invention include combination of compound (1-1) and compound (4-1), combination of compound (1-2) and compound (4-2), combination of compound (1-3) and compound (4-2), combination of compound (1-4) and compound (4-1), combination of compound (1-5) and compound (4-3), combination of compound (1-6) and compound (4-3), combination of compound (1-7) and compound (4-1), combination of compound (1-8) and compound (4-3), combination of compound (1-9) and compound (4-3), combination of compound (1-2-A) and compound (4-2), combination of compound (1-2-B) and compound (4-2), combination of compound (1-2-C) and compound (4-2), combination of compound (1-2-D) and compound (4-1), combination of compound (1-2-D) and compound (4-2), combination of compound (1-2-D) and compound (4-1-C), and the like.

In the composition of the present invention, the preferable content range of compound (4) per 1 mol of compound (1) varies depending on the kind of A.

When $A^+$ in compound (1) is hydrogen ion ($H^+$), the content of compound (4) is not less than 2 mol, preferably 2 to 3 mol, per 1 mol of compound (1).

When $A^+$ in compound (1) is a cation represented by the formula (2) or a cation represented by the formula (3), the content of compound (4) is generally 0.01 to 10 mol, preferably 0.01 to 3 mol, per 1 mol of compound (1).

Here, the content of compound (4) per 1 mol of compound (1) corresponds to the amount of each compound charged at the time of production, regardless of whether $A^+$ in compound (1) is a hydrogen ion ($H^+$), a cation represented by the formula (2), or a cation represented by the formula (3).

The composition of the present invention is soluble in a hydrocarbon solvent at room temperature (15 to 30° C.). In addition, conventionally-known borate compounds (e.g., hydrogenated tetrakis(pentafluorophenyl)borate, hydrogenated tetrakis(pentafluorophenyl)borate diethyl ether complex, lithium tetrakis(pentafluorophenyl)borate, etc.) are insoluble in aliphatic hydrocarbon solvents such as hexane and the like, and they could be a catalyst poison for metal catalysts used in homogenous polymerization reactions of olefins and dienes. In contrast, the composition of the present invention shows good solubility also in aliphatic hydrocarbon solvents and does not become a catalyst poison. Therefore, it is useful as a cocatalyst in homogenous polymerization reactions of olefins and dienes

Production Method of the Composition of the Present Invention

The production method of the composition of the present invention is explained below.

The composition of the present invention does not substantially contain an ether compound (e.g., diethyl ether, etc.) having a total carbon number of not more than 7 that could be a catalyst poison. Not substantially containing an ether compound having a total carbon number of not more than 7 means that, as a result of $^1$H-NMR analysis, an ether compound having a total carbon number of not more than 7 is not detected.

The production method of the composition of the present invention is not particularly limited, and the composition of the present invention can be produced, for example, according to the following Production Method 1 to Production Method 4, and the like.

(Production Method 1) (Production Method of the Composition of the Present Invention Containing Compound (1a) in which $A^+$ is a Hydrogen Ion ($H^+$))

Production Method 1 is a method for obtaining the composition of the present invention containing compound (1a) and compound (4) (or a complex of compound (1a) and compound (4)) by reacting compound (5) and a protic acid in the presence of compound (4) in a solvent that does not affect the reaction.

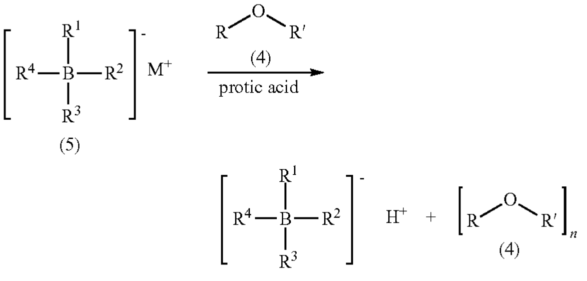

(5) (1a) (4)

wherein $M^+$ is a metal ion (e.g., lithium ion, potassium ion, sodium ion, etc.), n is a number of not less than 2, and other respective symbols are as defined above.

The reaction solvent for this reaction is not particularly limited. Examples thereof include aromatic hydrocarbons such as toluene, xylene, and the like; halogenated hydrocarbons such as chloroform, dichloromethane, 1,2-dichloroethane, and the like, aliphatic hydrocarbons such as hexane, isohexane, heptane, octane, methylcyclohexane, and the like, and a mixture thereof. Among them, dichloromethane, 1,2-dichloroethane, hexane, isohexane, heptane, octane, and methylcyclohexane are preferred.

As compound (5) to be used as a starting material in this production method, a metal salt in which $A^+$ in the aforementioned formula (1) is replaced with $M^+$ can be mentioned. As compound (5), a commercially available product or a purified product may also be used, or one prepared by a method known per se may be used. Specific examples of compound (5) include lithium tetrakis(pentafluorophenyl) borate, potassium tetrakis(pentafluorophenyl) borate, lithium tetrakis(heptafluoronaphthyl) borate, potassium tetrakis(heptafluoronaphthyl) borate, chloromagnesium tetrakis(pentafluorophenyl) borate, chloromagnesium tetrakis (heptafluoronaphthyl) borate, bromomagnesium tetrakis (pentafluorophenyl) borate, bromomagnesium tetrakis (heptafluoronaphthyl) borate, lithium tetrakis (nonafluorobiphenyl)borate, potassium tetrakis (nonafluorobiphenyl)borate, chloromagnesium tetrakis (nonafluorobiphenylyl)borate, bromomagnesium tetrakis (nonafluorobiphenyl)borate, and the like.

As compound (4) to be used in this production method, the aforementioned compound (4-1), compound (4-2), and the like can be mentioned.

The amount of compound (4) to be used is not less than 2 mol, preferably 2 to 3 mol, per 1 mol of compound (5).

As the protic acid to be used in this production method, hydrogen chloride, hydrochloric acid, sulfuric acid, nitric acid, hydrobromic acid, hydroiodic acid, and the like can be mentioned. Among them, hydrochloric acid and hydrogen chloride-diethyl ether solution are preferred.

The amount of the protic acid to be used poses no particular problem as long as it is equivalent or more with respect to 1 mol of compound (5). It is preferable to wash the organic phase with water until the pH of the aqueous phase after washing is not less than 3 so that the protic acid used in the organic phase after treatment will not remain. When the pH of the aqueous phase is less than 3, it is feared that a salt of the protic acid used in the organic phase remains in the composition of the present invention and becomes a catalyst poison at the time of polymerization.

The reaction temperature is generally 0° C. to 40° C., preferably 10° C. to 35° C., more preferably room temperature (15° C. to 30° C.), and the reaction time is generally about 10 min to 10 hr, preferably about 1 to 3 hr.

(Production Method 2) (Production Method of the Composition of the Present Invention Containing Compound (1a) in which $A^+$ is a Hydrogen Ion ($H^+$))

Production Method 2 is a method for obtaining the composition of the present invention containing compound (1a) and compound (4) (or a complex of compound (1a) and compound (4)) by reacting compound (6) and compound (4).

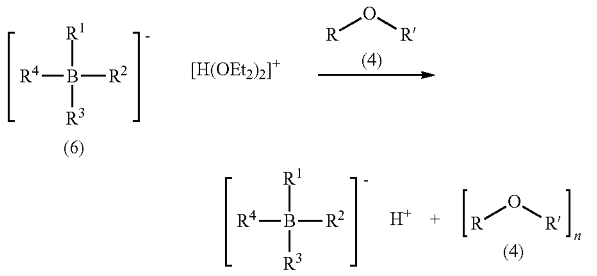

(6)
(1a)
(4)

wherein each symbol is as defined above.

The reaction solvent for this reaction is not particularly limited. Examples thereof include aromatic hydrocarbon solvents such as toluene, xylene, and the like; halogenated hydrocarbon solvents such as chloroform, dichloromethane, 1,2-dichloroethane, and the like, aliphatic hydrocarbon solvents such as hexane, isohexane, heptane, octane, methylcyclohexane, and the like, and a mixture thereof. Among them, dichloromethane, 1,2-dichloroethane, hexane, isohexane, heptane, octane, and methylcyclohexane are preferred.

As compound (6) to be used as a starting material in this production method, a commercially available product or one produced according to a method known per se (see, for example, Organometallics, 2000, 19, 1442-1444) or a method similar thereto can be used.

As compound (4) to be used in this production method, the aforementioned compound (4-1), compound (4-2), and the like can be mentioned.

The amount of compound (4) to be used is generally not less than 2 mol, preferably 2 to 3 mol, per 1 mol of compound (6).

The reaction temperature is generally 0° C. to 40° C., preferably 10° C. to 35° C., more preferably room temperature (15° C. to 30° C.), and the reaction time is generally about 10 min to 10 hr, preferably about 1 to 3 hr.

(Production Method 3) (Production Method of the Composition of the Present Invention Containing Compound (1b) in which $A^+$ is a Cation Other than a Hydrogen Ion ($H^+$))

Production Method 3 is a method for obtaining the composition of the present invention containing compound (1b) and compound (4) by a step of adding and suspending compound (6) and compound (7) (e.g., amine deprotonated from a cation represented by the aforementioned formula (2)) in a solvent that does not affect the reaction, adding dropwise protic acid to the suspension, stirring the mixture, filtering the mixture, and concentrating the filtrate under reduced pressure to obtain compound (1b) (step 1), and a step of mixing and stirring compound (1b) and compound (4) in a solvent that does not affect the reaction to give the composition of the present invention containing compound (1b) and compound (4) (step 2).

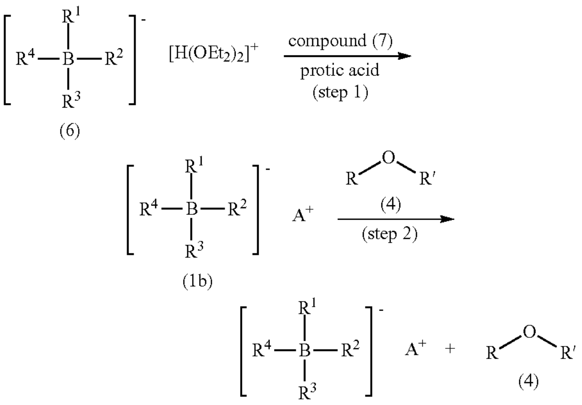

(6)
(1b)
(1b)
(4)

wherein each symbol is as defined above.

Step 1

As the solvent to be used in this step, hydrocarbon solvents such as toluene, n-hexane, isohexane, n-heptane, n-octane, cyclohexane, methylcyclohexane, and the like, and a mixture thereof can be mentioned. Among them, aliphatic hydrocarbon solvents such as n-hexane, isohexane, n-heptane, n-octane, cyclohexane, methylcyclohexane, and the like are preferred.

As compound (7) to be used in this step, a tertiary amine deprotonated from a cation represented by the aforementioned formula (2), and the like can be mentioned. Among them, tertiary amines such as di(hydrogenated tallow)alkylmethylamine, N,N-dioctadecylmethylamine, N,N-dioctadecylaniline, N,N-dioctadecyl-2,2,2-trifluoroethylamine, N,N-dioctadecyl-(2,3,4,5,6-pentafluorophenyl)methylamine, N,N-dioctadecyl-2,2,3,3,3-pentafluoropropylamine, N,N-didodecyl-2,2,2-trifluoroethylamine, N,N-dioctadecyl-2,2-difluoroethylamine, N,N-dioctadecyl-3,3,3-trifluoropropylamine, N,N-dioctadecyl-2-fluoroethylamine, N,N-didocosyl-2,2,2-trifluoroethylamine, N,N-bis(3,7,11,15-tetramethylhexadecyl)-2,2,2-trifluoroethylamine, N,N-bis(3,7,11-trimethyldodecyl)-2,2,2-trifluoroethylamine, N,N-ditetradecyl-2,2,2-trifluoroethylamine, N,N-dihexadecyl-2,2,2-trifluoroethylamine, and the like are preferred.

The amount of compound (7) to be used is generally 1 to 10 mol, preferably 1 to 2 mol, per 1 mol of compound (6).

As the protic acid to be used in this step, hydrogen chloride, sulfuric acid, nitric acid, hydrogen bromide, hydrogen iodide, and the like can be mentioned. Among them, hydrogen chloride is preferred (hydrogen chloride-diethyl ether solution is more preferred).

The amount of the protic acid to be used poses no particular problem as long as it is equivalent or more with respect to 1 mol of compound (7). It is preferable to wash the organic phase with water until the pH of the aqueous phase after washing is not less than 3 so that the protic acid used in the organic phase after treatment will not remain. When the pH of the aqueous phase is less than 3, it is feared that a salt of the protic acid used in the organic phase remains in the composition of the present invention and becomes a catalyst poison at the time of polymerization.

In Production Method 3, compound (1b) prepared as described above can be used as it is in step 2.

Step 2

The solvent to be used in this step is not particularly limited. Examples thereof include aliphatic hydrocarbon solvents such as n-hexane, isohexane, n-heptane, n-octane, cyclohexane, methylcyclohexane, and the like. Among them, n-hexane is preferred.

As compound (4) to be used in this step, the aforementioned compound (4-3), compound (4-4), and the like can be mentioned.

The amount of compound (4) to be used is generally 0.01 to 10 mol, preferably 0.01 to 3 mol, per 1 mol of compound (1b).

The reaction temperature is generally 0° C. to 40° C., preferably 10° C. to 35° C., more preferably room temperature (15° C. to 30° C.), and the reaction time is generally about 10 min to 10 hr, preferably about 1 to 3 hr.

(Production Method 4) (Production Method of the Composition of the Present Invention Containing Compound (1b) in which $A^+$ is a Cation Other than a Hydrogen Ion ($H^+$))

Production Method 4 is a method for obtaining the composition of the present invention containing compound (1b) and compound (4) by a step of adding compound (8) and compound (5) to a solvent that does not affect the reaction, stirring the mixture, filtering the mixture, and concentrating the filtrate under reduced pressure to give compound (1b) (step 1), and a step of mixing and stirring compound (1b) and compound (4) in a solvent that does not affect the reaction (step 2).

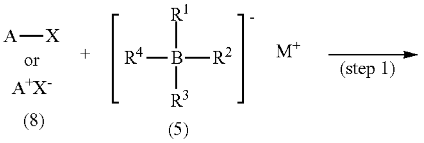

(8) (5)

-continued

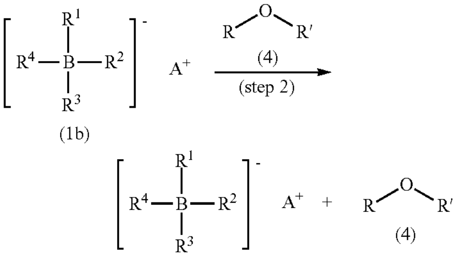

(1b) (4)
(1b) (4)

wherein X is a halogen atom, and other respective symbols are as defined above.

Step 1

As the solvent to be used in this step, hydrocarbon solvents such as toluene, n-hexane, isohexane, n-heptane, n-octane, cyclohexane, methylcyclohexane, n-heptane, and the like, halogenated solvents such as dichloromethane, chloroform, and the like, and a mixture thereof can be mentioned. Among them, aliphatic hydrocarbon solvents such as n-hexane, isohexane, n-heptane, n-octane, cyclohexane, methylcyclohexane, and the like are preferred.

As compound (8) to be used in this step, N,N-dioctadecylmethylamine hydrochloride, di(hydrogenated tallow) alkylmethylamine hydrochloride, N,N-dioctadecylaniline hydrochloride, N,N-dioctadecyl-2,2,2-trifluoroethylamine hydrochloride, N,N-dioctadecyl-(2,3,4,5,6-pentafluorophenyl)methylamine hydrochloride, N,N-dioctadecyl-2,2,3,3,3-pentafluoropropylamine hydrochloride, N,N-didodecyl-2,2,2-trifluoroethylamine hydrochloride, N,N-dioctadecyl-2,2-difluoroethylamine hydrochloride, N,N-dioctadecyl-3,3,3-trifluoropropylamine hydrochloride, N,N-dioctadecyl-2-fluoroethylamine hydrochloride, N,N-didocosyl-2,2,2-trifluoroethylamine hydrochloride, N,N-bis(3,7,11,15-tetramethylhexadecyl)-2,2,2-trifluoroethylamine hydrochloride, N,N-bis(3,7,11-trimethyldodecyl)-2,2,2-trifluoroethylamine hydrochloride, N,N-ditetradecyl-2,2,2-trifluoroethylamine hydrochloride, N,N-dihexadecyl-2,2,2-trifluoroethylamine hydrochloride, or tri(p-octylphenyl)chloromethane is preferred.

The amount of compound (8) to be used is generally 1 to 2 mol, preferably 1 to 1.1 mol, per 1 mol of compound (5).

In Production Method 4, compound (1b) prepared as described above can be used as it is in step 2.

Step 2

The solvent to be used in this step is not particularly limited. Examples thereof include aliphatic hydrocarbon solvents such as n-hexane, isohexane, n-heptane, n-octane, cyclohexane, methylcyclohexane, and the like. Among them, n-hexane is preferred.

As compound (4) to be used in this step, the aforementioned compound (4-3), compound (4-4), and the like can be mentioned.

The amount of compound (4) to be used is generally 0.01 to 10 mol, preferably 0.01 to 3 mol, per 1 mol of compound (1b).

The reaction temperature is generally 0° C. to 40° C., preferably 10° C. to 35° C., more preferably room temperature (15° C. to 30° C.), and the reaction time is generally about 10 min to 10 hr, preferably about 1 to 3 hr.

The composition of the present invention contains compound (1) and compound (4), soluble (or easily soluble) in hydrocarbon solvents, particularly aliphatic hydrocarbon solvents, and does not substantially contain a compound that could be a catalyst poison such as basic and highly nucleophilic amine compound, ether compound with a total carbon number of not more than 7, and the like. Therefore, it is useful as a cocatalyst for polymerization of olefins and dienes.

The present invention includes a production method of a polymer by polymerizing at least one kind of monomer selected from the group consisting of an olefin and a diene, by using the composition of the present invention as a cocatalyst.

Production of a polymer by using the compound of the present invention (compound (1)) (or composition) as a cocatalyst can be specifically performed according to, for example, the method described in the below-mentioned Experimental Example.

EXAMPLE

The present invention is specifically explained in detail in the following by referring to Examples, Production Examples, and Experimental Example; however, the present invention is not limited to those Examples and the like. % means mol/mol % for yield and wt % for others unless particularly indicated. The room temperature refers to a temperature of from 15° C. to 30° C. unless particularly indicated.

For the analysis, the following instrument was used.

$^1$H-NMR and $^{19}$F-NMR: (JEOL) 400YH manufactured by JEOL Ltd.

Example 1

Dihexadecyl ether (manufactured by Tokyo Chemical Industry Co., Ltd.) (0.92 g, 1.93 mmol) and a lithium tetrakis(pentafluorophenyl)borate tri-diethyl ether complex (manufactured by AGC INC.) (1.00 g, 0.97 mmol) were added to dichloromethane (10 ml), 6 M hydrochloric acid (15 ml) was added, and the mixture was stirred at room temperature for 1 hr. The reaction mixture was partitioned, and the organic phase was concentrated. To the concentrated solution was added n-hexane (15 ml), and the mixture was stirred and concentrated. This operation was repeated to give an oily hydrogenated tetrakis(pentafluorophenyl)borate bis (dihexadecyl ether) complex (1.67 g).

$^1$H NMR ($CDCl_3$) δ: 0.88 (t, 12H), 1.25 (m, 104H), 1.59 (m, 8H), 3.60 (t, 8H);

$^{19}$F NMR($CDCl_3$) δ: −132.9 (d, 8F), −162.2 (t, 4F), −166.3 (t, 8F).

It was confirmed that the complex (composition) obtained in Example 1 dissolves in n-hexane at a concentration of 20 wt %.

Example 2

Dihexadecyl ether (0.56 g, 1.21 mmol) and a hydrogenated tetrakis(pentafluorophenyl)borate diethyl ether complex (0.50 g, 0.60 mmol) obtained by a method known per se (see, for example, Organometallics, 2000, 19, 1442-1444) was dissolved in 1,2-dichloroethane (10 ml), and the mixture was concentrated. To the concentrated solution was added 1,2-dichloroethane (10 ml), and the mixture was stirred and then concentrated. This operation was repeated twice. To the concentrated solution was added n-hexane (10 ml), and the mixture was stirred and then concentrated. This operation was repeated three times to obtain an oily hydrogenated tetrakis(pentafluorophenyl)borate bis(dihexadecyl ether) complex (0.97 g).

Example 3

Ditetradecyl ether (manufactured by Tokyo Chemical Industry Co., Ltd.) (0.50 g, 1.21 mmol) and a hydrogenated tetrakis(pentafluorophenyl)borate diethyl ether complex (0.50 g, 0.60 mmol) were dissolved in 1,2-dichloroethane (10 ml), and the mixture was concentrated. To the concentrated solution was added 1,2-dichloroethane (10 ml), and the mixture was stirred and then concentrated. This operation was repeated twice. To the concentrated solution was added hexane (10 ml), and the mixture was stirred and then concentrated. This operation was repeated three times to give an oily hydrogenated tetrakis(pentafluorophenyl)borate bis(ditetradecyl ether) complex (0.94 g).

$^1$H NMR ($CDCl_3$) δ: 0.88 (t, 12H), 1.25 (m, 88H), 1.65 (m, 8H), 3.79 (t, 8H);

$^{19}$F NMR($CDCl_3$) δ: −132.9 (d, 8F), −162.2 (t, 4F), −166.3 (t, 8F).

It was confirmed that the complex (composition) obtained in Example 3 dissolves in n-hexane at a concentration of 20 wt %.

Example 4

(1) N,N-Dioctadecylaniline (3.3 g, 5.5 mmol) produced by a method known per se (see, for example, Huaxue Xuebao, 2008, 66(14), 1687-1692) and a lithium tetrakis (perfluorophenyl)borate tri-diethyl ether complex (5.0 g, 5.5 mmol) were suspended in n-hexane (50 mL). Then, 1.0 M hydrogen chloride-diethyl ether solution (5.5 mL) was added dropwise, and the mixture was stirred at room temperature for 3 hr. The obtained suspension was filtered, and the filtrate was concentrated under reduced pressure at 50° C. to give N,N-dioctadecylanilinium tetrakis(pentafluorophenyl)borate (7.0 g, 90%).

$^1$H NMR ($CDCl_3$) δ: 0.86-0.89 (6H, m), 1.15-1.50 (27H, m), 3.40-3.50 (4H, m), 7.26-7.28 (2H, m), 7.58-7.63 (3H, m);

$^{19}$F NMR ($CDCl_3$) δ: −133.8 (8F, t), −163.3 (4F, t), −167.4 (8F, t).

(2) To N,N-dioctadecylanilinium tetrakis(pentafluorophenyl)borate (127.8 mg, 0.1 mmol) obtained the above-mentioned (1) was added n-hexane (474 mg) to prepare a two-layer separation solution (concentration: 20 wt %). Ditetradecyl ether (21 mg, 0.05 mmol) was added thereto, and the mixture was stirred to give a homogeneous n-hexane solution.

Example 5

To N,N-dioctadecylanilinium tetrakis(pentafluorophenyl) borate (127.8 mg, 0.1 mmol) obtained in Example 4 (1) was added n-hexane (474 mg) to prepare a two-layer separation solution (concentration: 20 wt %). Didodecyl ether (manufactured by Tokyo Chemical Industry Co., Ltd.) (17.7 mg, 0.05 mmol) was added thereto, and the mixture was stirred to give a homogeneous n-hexane solution.

Example 6

To N,N-dioctadecylanilinium tetrakis(pentafluorophenyl) borate (127.8 mg, 0.1 mmol) obtained in Example 4 (1) was added n-hexane (474 mg) to prepare a two-layer separation solution (concentration: 20 wt %). Dibutyl ether (manufactured by Junsei Chemical Co., Ltd.) (6.5 mg, 0.2 mmol) was added thereto, and the mixture was stirred to give a homogeneous n-hexane solution.

Example 7

Dioctadecyl ether (manufactured by Tokyo Chemical Industry Co., Ltd.) (0.66 g, 1.21 mmol) and hydrogenated tetrakis(pentafluorophenyl)borate diethyl ether complex (0.50 g, 0.60 mmol) were dissolved in dichloromethane (15 ml), and the mixture was concentrated. To the concentrated solution was added dichloromethane (15 ml), and the mixture was stirred and then concentrated. This operation was repeated 4 times. To the concentrated solution was added n-hexane (10 ml), and the mixture was stirred and then concentrated. This operation was repeated three times to give a solid hydrogenated tetrakis(pentafluorophenyl)borate bis(dioctadecyl ether) complex (1.05 g).

$^{1}$H NMR ($CDCl_3$) δ: 0.88 (t, 12H), 1.25 (m, 120H), 1.65 (m, 8H), 3.79 (t, 8H);

$^{19}$F NMR($CDCl_3$) δ: −132.9 (d, 8F), −162.2 (t, 4F), −166.3 (t, 8F).

It was confirmed that the complex (composition) obtained in Example 7 dissolves in n-hexane at a concentration of 20 wt %.

Example 8

Didodecyl ether (manufactured by Tokyo Chemical Industry Co., Ltd.) (0.45 g, 1.21 mmol) and a hydrogenated tetrakis(pentafluorophenyl)borate diethyl ether complex (0.50 g, 0.60 mmol) were dissolved in 1,2-dichloroethane (10 ml), and the mixture was concentrated. To the concentrated solution was added 1,2-dichloroethane (10 ml), and the mixture was stirred and then concentrated. This operation was repeated twice. To the concentrated solution was added methylcyclohexane (10 ml), and the mixture was stirred and then concentrated. This operation was repeated three times to give an oily hydrogenated tetrakis(pentafluorophenyl)borate bis(didodecyl ether) complex (0.90 g).

$^{1}$H NMR ($CDCl_3$) δ: 0.88 (t, 12H), 1.25 (m, 72H), 1.65 (m, 8H), 3.60 (t, 8H);

$^{19}$F NMR($CDCl_3$) δ: −132.9 (d, 8F), −162.2 (t, 4F), −166.3 (t, 8F).

It was confirmed that the complex (composition) obtained in Example 8 dissolves in methylcyclohexane at a concentration of 20 wt %.

Example 9

Didecyl ether (manufactured by Tokyo Chemical Industry Co., Ltd.) (0.38 g, 1.21 mmol) and a hydrogenated tetrakis (pentafluorophenyl)borate diethyl ether complex (0.50 g, 0.60 mmol) were dissolved in 1,2-dichloroethane (10 ml), and the mixture was concentrated. To the concentrated solution was added 1,2-dichloroethane (10 ml), and the mixture was stirred and then concentrated. This operation was repeated twice. To the concentrated solution was added methylcyclohexane (10 ml), and the mixture was stirred and then concentrated. This operation was repeated three times to give an oily hydrogenated tetrakis(pentafluorophenyl) borate bis(didecyl ether) complex (0.81 g).

$^{1}$H NMR ($CDCl_3$) δ: 0.88 (t, 12H), 1.25 (m, 56H), 1.65 (m, 8H), 3.60 (t, 8H);

$^{19}$F NMR($CDCl_3$) δ: −132.9 (d, 8F), −162.2 (t, 4F), −166.3 (t, 8F).

It was confirmed that the complex (composition) obtained in Example 9 dissolves in methylcyclohexane at a concentration of 20 wt %.

Example 10

A diethyl ether solution of lithium tetrakis(heptafluoronaphthyl)borate (47 wt %, 5.00 g, 2.28 mmol) produced by a method known per se (see, for example, WO 2007/070770) was added to 1,2-dichloroethane (10 ml). Then, 6 M hydrochloric acid (7.6 ml) was added and the mixture was stirred at room temperature for 1 hr. The reaction mixture was partitioned, and the organic phase was concentrated. The concentrated solution was dissolved by adding ditetradecyl ether (manufactured by Tokyo Chemical Industry Co., Ltd.) (1.88 g, 4.55 mmol) and 1,2-dichloroethane (30 ml), and the mixture was concentrated. To the concentrated solution was added 1,2-dichloroethane (30 ml), and the mixture was stirred and then concentrated. This operation was repeated twice. To the concentrated solution was added n-hexane (30 ml), and the mixture was stirred and then concentrated. This operation was repeated three times to give an oily hydrogenated tetrakis(heptafluoronaphthyl)borate bis(ditetradecyl ether) complex (4.21 g).

$^{1}$H NMR ($CDCl_3$) δ: 0.87 (t, 12H), 1.22 (m, 88H), 1.58 (m, 8H), 3.66 (t, 8H);

$^{19}$F NMR ($CDCl_3$) δ: −108.3 (m, 4F), −125.1 (m, 4F), −145.1 (n, 4F), −149.0 (n, 4F), −154.5 (m, 4F), −158.3 (m, 4F), −159.8 (m, 4F).

It was confirmed that the complex (composition) obtained in Example 10 dissolves in n-hexane at a concentration of 20 wt %.

Production Example 1

Docosylbromide (manufactured by Tokyo Chemical Industry Co., Ltd.) (1.00 g, 2.57 mmol) and cesium carbonate (1.26 g, 3.85 mmol) were added to ethanol (20 ml), and the mixture was reacted in a microwave synthesizer (manufactured by Biotage) at 150° C. for 30 min. After completion of the reaction, water and methylcyclohexane were added for partitioning, and the organic phase was concentrated. The concentrated solution was purified by column chromatography to give docosyl ethyl ether (0.60 g) as a white solid.

$^{1}$H NMR ($CDCl_3$) δ: 0.89 (t, 3H), 1.21 (t, 3H), 1.26 (m, 38H), 1.57 (m, 2H), 3.41 (t, 2H), 3.47 (q, 2H).

Example 11

Docosyl ethyl ether (0.21 g, 0.60 mmol) obtained in Production Example 1 and a hydrogenated tetrakis(pentafluorophenyl)borate diethyl ether complex (0.25 g, 0.30 mmol) were dissolved in 1,2-dichloroethane (5 ml), and the mixture was concentrated. To the concentrated solution was added 1,2-dichloroethane (5 ml), and the mixture was stirred and then concentrated. This operation was repeated twice. To the concentrated solution was added methylcyclohexane (5 ml), and the mixture was stirred and then concentrated. This operation was repeated three times to give a solid hydrogenated tetrakis(pentafluorophenyl)borate bis(docosyl ethyl ether) complex (0.46 g).

$^{1}$H NMR ($CDCl_3$) δ: 0.87 (m, 12H), 1.27 (m, 82H), 1.65 (m, 4H), 3.76 (t, 4H), 3.85 (q, 4H);

$^{19}$F NMR($CDCl_3$) δ: −132.9 (d, 8F), −162.2 (t, 4F), −166.3 (t, 8F).

It was confirmed that the complex (composition) obtained in Example 11 dissolves in methylcyclohexane at a concentration of 20 wt %.

Production Example 2

Tetradecylbromide (manufactured by Tokyo Chemical Industry Co., Ltd.) (1.79 g, 6.44 mmol), ethylene glycol (0.20 g, 3.22 mmol), tetrabutylammonium bromide (manufactured by Tokyo Chemical Industry Co., Ltd.) (0.10 g, 0.32 mmol), and potassium hydroxide (0.64 g, 9.67 mmol) were added to dioxane (10 ml), and the mixture was heated at 100° C. for 3 hr. After cooling, water and diethyl ether were added thereto for partitioning. The organic phase was dried over sodium sulfate, and then concentrated. The concentrate was purified by column chromatography to give ethylene glycol ditetradecyl ether (0.32 g) as a white solid.

$^1$H NMR ($CDCl_3$) δ: 0.88 (t, 6H), 1.25 (m, 44H), 1.58 (m, 4H), 3.46 (t, 4H), 3.57 (s, 4H).

Example 12

Ethylene glycol ditetradecyl ether (0.22 g, 0.48 mmol) obtained in Production Example 2 and a hydrogenated tetrakis(pentafluorophenyl)borate diethyl ether complex (0.20 g, 0.24 mmol) were dissolved in 1,2-dichloroethane (5 ml), and the mixture was concentrated. To the concentrated solution was added 1,2-dichloroethane (5 ml), and the mixture was stirred and then concentrated. This operation was repeated twice. To the concentrated solution was added n-hexane (5 ml), and the mixture was stirred and then concentrated. This operation was repeated three times to give an oily hydrogenated tetrakis(pentafluorophenyl)borate bis (ethylene glycol ditetradecyl ether) complex (0.41 g).

$^1$H NMR ($CDCl_3$) δ: 0.87 (t, 12H), 1.27 (m, 88H), 1.58 (m, 8H), 3.58 (t, 8H), 3.70 (s, 8H);

$^{19}$F NMR($CDCl_3$) δ: −132.9 (d, 8F), −162.2 (t, 4F), −166.3 (t, 8F).

It was confirmed that the complex (composition) obtained in Example 12 dissolves in n-hexane at a concentration of 20 wt %.

Production Example 3

N,N-Dioctadecylamine (2.0 g, 3.8 mmol) and triethylamine (0.5 g, 5.0 mmol) were dissolved in tetrahydrofuran (10 mL), and trifluoroacetic anhydride (1.0 g, 4.8 mmol) was added at room temperature. The mixture was stirred at room temperature for 1 hr, water was added, and the mixture was extracted with ethyl acetate. The organic layer was washed with 1 M hydrochloric acid and saturated brine, dried over anhydrous magnesium sulfate, and concentrated under reduced pressure. The residue was purified by column chromatography (n-hexane/ethyl acetate=100/0-95/5) to give N,N-dioctadecyl-2,2,2-trifluoroacetamide (1.87 g, 79%).

$^1$H NMR ($CDCl_3$) δ: 0.89 (6H, t), 1.26-1.43 (62H, m), 1.56-1.59 (4H, m), 3.30-3.37 (4H, m);

$^{19}$F NMR ($CDCl_3$) δ: −68.1 (3F, s).

Production Example 4

N,N-Dioctadecyl-2,2,2-trifluoroacetamide (1.0 g, 1.6 mmol) obtained in Production Example 3 was dissolved in tetrahydrofuran (10 mL), 1 M borane-tetrahydrofuran complex tetrahydrofuran solution (5 mL) was added, and the mixture was refluxed for 3 hr. The mixture was ice-cooled, water was carefully added dropwise thereto, and the mixture was extracted with ethyl acetate. The organic layer was washed with saturated brine, dried over anhydrous magnesium sulfate, and concentrated under reduced pressure to give N,N-dioctadecyl-2,2,2-trifluoroethylamine (0.87 g, 88%).

$^1$H NMR ($CDCl_3$) δ: 0.88 (6H, t), 1.25-1.40 (60H, m), 1.42-1.44 (4H, m), 2.56 (4H, t), 3.00 (2H, q);

$^{19}$F NMR ($CDCl_3$) δ: −69.2 (3F, t).

Production Example 5

N,N-Dioctadecyl-2,2,2-trifluoroethylamine (1.0 g, 1.7 mmol) obtained in Production Example 4 was dissolved in n-hexane (10 mL), 1.0 M hydrogen chloride-diethyl ether solution (10 mL) was added, and the mixture was stirred at room temperature for 3 hr. The precipitate was collected by filtration, washed with n-hexane, and dried under reduced pressure to give N,N-dioctadecyl-2,2,2-trifluoroethylamine hydrochloride (0.987 g, 93%).

$^1$H NMR ($CDCl_3$) δ: 0.88 (6H, t), 1.19-1.40 (60H, m), 1.93 (4H, br s), 3.15 (4H, br s), 3.77 (2H, q);

$^{19}$F NMR ($CDCl_3$) δ: −61.4 (3F, t).

Production Example 6

N,N-Dioctadecyl-2,2,2-trifluoroethylamine hydrochloride (0.32 g, 0.50 mmol) obtained in Production Example 5 was dissolved in chloroform (30 mL), lithium tetrakis(pentafluorophenyl)borate tri-diethyl ether complex (0.45 g, 0.5 mmol) was added, and the mixture was stirred at room temperature for 1 hr. Insoluble material was removed by filtration, and the filtrate was concentrated under reduced pressure. The residue was dried under reduced pressure at 45° C. to give N,N-dioctadecyl-2,2,2-trifluoroethylammonium tetrakis(pentafluorophenyl)borate (0.62 g, 97%).

$^1$H NMR ($CDCl_3$) δ: 0.88 (6H, t), 1.19-1.40 (60H, m), 1.94 (4H, br s), 3.15 (4H, br s), 3.77 (2H, q);

$^{19}$F NMR ($CDCl_3$) δ: −64.7 (3F, t), −132.1 (8H, m), −161.1 (4H, m), −165.5 (8H, m).

Example 13

N,N-Dioctadecyl-2,2,2-trifluoroethylammonium tetrakis (pentafluorophenyl)borate (0.30 g, 0.22 mmol) obtained in Production Example 6 was mixed with ditetradecyl ether (0.09 g, 0.22 mmol) to give a composition containing N,N-dioctadecyl-2,2,2-trifluoroethylammonium tetrakis (pentafluorophenyl)borate and ditetradecyl ether.

$^1$H NMR ($CDCl_3$) δ: 0.85-0.90 (12H, m), 1.20-1.33 (104H, m), 1.52-1.68 (8H, m), 3.14-3.18 (4H, m), 3.40 (4H, t), 3.62 (2H, q);

$^{19}$F NMR ($CDCl_3$) δ: −66.8 (3F, br s), −134.0 (8F, m), −163.2 (4F, t), −167.5 (8F, m).

n-Hexane was added to the composition obtained in Example 13 to prepare a 20 wt % n-hexane solution thereof, and the solution was confirmed to be a homogeneous solution.

Isohexane was added to the composition obtained in Example 13 to prepare a 20 wt % isohexane solution thereof, and the solution was confirmed to be a homogeneous solution.

n-Heptane was added to the composition obtained in Example 13 to prepare a 20 wt % n-heptane solution thereof, and the solution was confirmed to be a homogeneous solution.

ISOPAR E® was added to the composition obtained in Example 13 to prepare a 20 wt % ISOPAR E® solution thereof, and the solution was confirmed to be a homogeneous solution.

Cyclohexane was added to the composition obtained in Example 13 to prepare a 20 wt % cyclohexane solution thereof, and the solution was confirmed to be a homogeneous solution.

Methylcyclohexane was added to the composition obtained in Example 13 to prepare a 20 wt % methylcyclohexane solution thereof, and the solution was confirmed to be a homogeneous solution.

Example 14

N,N-Dioctadecyl-2,2,2-trifluoroethylammonium tetrakis (pentafluorophenyl)borate (300 mg, 0.23 mmol) obtained in Production Example 6 was mixed with dibutyl ether (62 mg, 0.46 mmol) to give a composition containing N,N-dioctadecyl-2,2,2-trifluoroethylammonium tetrakis(pentafluorophenyl)borate and dibutyl ether.

$^1$H NMR ($CDCl_3$) δ: 0.87 (6H, t), 0.92 (12H, t), 1.20-1.68 (78H, m), 3.14-3.18 (4H, m), 3.41 (8H, t), 3.62 (2H, q);

$^{19}$F NMR ($CDCl_3$) δ: −66.7 (3F, s), −134.0 (8F, s), −163.3 (4F, t), −167.5 (8H, m).

It was confirmed that the composition obtained in Example 14 dissolves in n-hexane at a concentration of 30 wt %.

Example 15

N,N-Ditetradecyl-2,2,2-trifluoroethylammonium tetrakis (pentafluorophenyl)borate (58 mg, 0.05 mmol) and didodecyl ether (40 mg, 0.10 mmol) were added and mixed to give a composition containing N,N-ditetradecyl-2,2,2-trifluoroethylammonium tetrakis(pentafluorophenyl)borate and didodecyl ether.

$^1$H NMR ($CDCl_3$) δ: 0.85-0.88 (18H, m), 1.24-1.35 (116H, m), 1.51-1.58 (8H, m), 1.64-1.70 (4H, m), 3.11-3.15 (4H, m), 3.38 (8H, t), 3.60 (2H, q);

$^{19}$F NMR ($CDCl_3$) δ: −66.6 (3F, s), −134.0 (8F, s), −163.5 (4F, t), −167.6 (8F, t).

n-Hexane was added to the composition obtained in Example 15 to prepare a 20 wt % n-hexane solution thereof, and the solution was confirmed to be a homogeneous solution.

Example 16

N,N-Dihexadecyl-2,2,2-trifluoroethylammonium tetrakis (pentafluorophenyl)borate (60 mg, 0.05 mmol) and dihexadecyl ether (23 mg, 0.05 mmol) were added and mixed to give a composition containing N,N-dihexadecyl-2,2,2-trifluoroethylammonium tetrakis(pentafluorophenyl)borate and dihexadecyl ether.

$^1$H NMR ($CDCl_3$) δ: 0.86-0.90 (12H, m), 1.20-1.36 (104H, m), 1.52-1.58 (4H, m), 1.63-1.70 (4H, m), 3.15-3.19 (4H, m), 3.39 (4H, t), 3.64 (2H, q);

$^{19}$F NMR ($CDCl_3$) δ: −66.7 (3F, s), −134.1 (8F, s), −163.5 (4F, t), −167.6 (8F, t).

n-Hexane was added to the composition obtained in Example 16 to prepare a 20 wt % n-hexane solution thereof, and the solution was confirmed to be a homogeneous solution.

Example 17

N,N-Dioctadecyl-2,2,2-trifluoroethylammonium tetrakis (pentafluorophenyl)borate (64 mg, 0.05 mmol) obtained in Production Example 6 and dioctyl ether (12 mg, 0.05 mmol) were added and mixed to give a composition containing N,N-dioctadecyl-2,2,2-trifluoroethylammonium tetrakis (pentafluorophenyl)borate and dioctyl ether.

$^1$H NMR ($CDCl_3$) δ: 0.88 (12H, t), 1.20-1.37 (80H, m), 1.52-1.58 (4H, m), 1.65-1.70 (4H, m), 3.14-3.19 (4H, m), 3.39 (4H, t), 3.63 (2H, q);

$^{19}$F NMR ($CDCl_3$) δ: −66.6 (3F, br s), −134.0 (8F, br s), −163.4 (4F, t), −167.6 (8F, t).

n-Hexane was added to the composition obtained in Example 17 to prepare a 20 wt % n-hexane solution thereof, and the solution was confirmed to be a homogeneous solution.

Example 18

N,N-Dioctadecyl-2,2,2-trifluoroethylammonium tetrakis (pentafluorophenyl)borate (64 mg, 0.05 mmol) obtained in Production Example 6 and didodecyl ether (15 mg, 0.05 mmol) were added and mixed to give a composition containing N,N-dioctadecyl-2,2,2-trifluoroethylammonium tetrakis(pentafluorophenyl)borate and didodecyl ether.

$^1$H NMR ($CDCl_3$) δ: 0.86-0.90 (12H, m), 1.20-1.38 (96H, m), 1.53-1.60 (4H, m), 1.65-1.72 (4H, m), 3.15-3.20 (4H, m), 3.39 (4H, t), 3.65 (2H, q);

$^{19}$F NMR ($CDCl_3$) δ: −66.4 (3F, br s), −134.0 (8F, br s), −163.4 (4F, t), −167.5 (8F, m)).

n-Hexane was added to the composition obtained in Example 18 to prepare a 20 wt % n-hexane solution thereof, and the solution was confirmed to be a homogeneous solution.

Example 19

N,N-Dioctadecyl-2,2,2-trifluoroethylammonium tetrakis (pentafluorophenyl)borate (64 mg, 0.05 mmol) obtained in Production Example 6 and dihexadecyl ether (23 mg, 0.05 mmol) were added and mixed to give a composition containing N,N-dioctadecyl-2,2,2-trifluoroethylammonium tetrakis(pentafluorophenyl)borate and dihexadecyl ether.

$^1$H NMR ($CDCl_3$) δ: 0.86-0.98, (12H, m), 1.20-1.35 (112H, m), 1.52-1.75 (8H, m), 3.15-3.20 (4H, m), 3.39 (4H, t), 3.65 (2H, q);

$^{19}$F NMR ($CDCl_3$) δ: −66.5 (3F, br s), −134.2 (8F, br s), −163.6 (4F, t), −167.7 (8F, m).

n-Hexane was added to the composition obtained in Example 19 to prepare a 20 wt % n-hexane solution thereof, and the solution was confirmed to be a homogeneous solution.

Example 20

N,N-Dioctadecyl-2,2,2-trifluoroethylammonium tetrakis (pentafluorophenyl)borate (64 mg, 0.05 mmol) obtained in Production Example 6 and diphenyl ether (8.5 mg, 0.05 mmol) were added and mixed to give a composition containing N,N-dioctadecyl-2,2,2-trifluoroethylammonium tetrakis(pentafluorophenyl)borate and diphenyl ether.

$^1$H NMR ($CDCl_3$) δ: 0.86-0.90, (6H, m), 1.20-1.40 (58H, m), 1.62-1.68 (4H, m), 3.12-3.16 (4H, m), 3.61 (4H, q), 6.99-7.03 (4H, m), 7.08-7.12 (2H, m), 7.31-7.36 (4H, m);

$^{19}$F NMR ($CDCl_3$) δ: −66.9 (3F, br s), −134.1 (8F, br s), −163.4 (4F, t), −167.6 (8F, m).

n-Hexane was added to the composition obtained in Example 20 to prepare a 20 wt % n-hexane solution thereof, and the solution was confirmed to be a homogeneous solution.

Example 21

N,N-Dioctadecyl-2,2,2-trifluoroethylammonium tetrakis (pentafluorophenyl)borate (64 mg, 0.05 mmol) obtained in Production Example 6 and octadecyl phenyl ether (18 mg, 0.05 mmol) were added and mixed to give a composition containing N,N-dioctadecyl-2,2,2-trifluoroethylammonium tetrakis(pentafluorophenyl)borate and octadecyl phenyl ether.

$^1$H NMR ($CDCl_3$) δ: 0.84-0.98 (12H, m), 1.20-1.44 (85H, m), 1.62-1.81 (6H, m), 3.13-3.18 (4H, m), 3.61 (4H, q), 3.95 (2H, t), 6.88-6.94 (2H, m), 7.25-7.30 (3H, m);

$^{19}$F NMR ($CDCl_3$) δ: −66.8 (3F, br s), −134.1 (8F, br s), −163.4 (4F, t), −167.6 (8F, m).

n-Hexane was added to the composition obtained in Example 21 to prepare a 20 wt % n-hexane solution thereof, and the solution was confirmed to be a homogeneous solution.

Example 22

N,N-Dioctadecyl-2,2,2-trifluoroethylammonium tetrakis (pentafluorophenyl)borate (64 mg, 0.05 mmol) obtained in Production Example 6 and cyclopentyl methyl ether (10 mg, 0.10 mmol) were added and mixed to give a composition containing N,N-dioctadecyl-2,2,2-trifluoroethylammonium tetrakis(pentafluorophenyl)borate and cyclopentyl methyl ether.

$^1$H NMR ($CDCl_3$) δ: 0.88 (6H, t), 1.20-1.35 (60H, m), 1.53-1.56 (4H, m), 1.61-1.76 (16H, m), 3.12-3.17 (4H, m), 3.28 (6H, s), 3.61 (2H, q), 3.79-3.83 (2H, m);

$^{19}$F NMR ($CDCl_3$) δ: −66.6 (3F, br s), −133.9 (8F, br s), −163.5 (4F, t), −167.6 (8F, m).

n-Hexane was added to the composition obtained in Example 22 to prepare a 20 wt % n-hexane solution thereof, and the solution was confirmed to be a homogeneous solution.

Production Example 7

Synthesis of N,N-ditetradecyl-2,2,2-trifluoroethylamine

1-Tetradecanal (4.0 g, 18.8 mmol), 2,2,2-trifluoroethylamine (0.90 g, 9.1 mmol), and acetic acid (0.3 mL) were dissolved in tetrahydrofuran (30 mL), sodium triacetoxyborohydride (4.0 g, 18.9 mmol) was added, and the mixture was stirred at room temperature for 15 hr. The reaction mixture was basified by adding saturated aqueous sodium hydrogen carbonate solution, and extracted with n-hexane. The organic layer was washed with saturated brine, dried over anhydrous sodium sulfate, and concentrated under reduced pressure. The residue was purified by silica gel column chromatography (n-hexane/ethyl acetate=100/0-95/5) to give the title compound (4.0 g, 89%).

$^1$H NMR ($CDCl_3$) δ: 0.88 (6H, t), 1.26-1.43 (48H, m), 2.55 (4H, t), 3.00 (2H, q);

$^{19}$F NMR ($CDCl_3$) δ: −71.3 (3F, t).

Production Example 8

Synthesis of N,N-ditetradecyl-2,2,2-trifluoroethylamine hydrochloride

N,N-Ditetradecyl-2,2,2-trifluoroethylamine (1.50 g, 3.05 mmol) obtained in Production Example 7 was dissolved in n-hexane (30 mL), 1.0 M hydrogen chloride-diethyl ether solution (20 mL) was added, and the mixture was stirred for 1 hr. The reaction mixture was concentrated under reduced pressure to give the title compound (1.45 g, 90%).

$^1$H NMR ($CDCl_3$) δ: 0.88 (6H, t), 1.20-1.40 (44H, m), 1.96 (4H, br s), 3.15 (4H, br s), 3.78 (2H, q);

$^{19}$F NMR ($CDCl_3$) δ: −63.4 (3F, t).

Production Example 9

Synthesis of N,N-ditetradecyl-2,2,2-trifluoroethylammonium tetrakis(pentafluorophenyl)borate N,N-Ditetradecyl-2,2,2-trifluoroethylamine hydrochloride (0.60 g, 1.14 mmol) obtained in Production Example 8 was dissolved in chloroform (30 mL), lithium tetrakis(pentafluorophenyl)borate tri-diethyl ether complex (1.04 g, 1.14 mmol) was added, and the mixture was stirred at room temperature for 1 hr. Insoluble material was removed by filtration, and the filtrate was concentrated under reduced pressure. The residue was dried under reduced pressure at 70° C. to give the title compound (1.34 g, 100%).

$^1$H NMR ($CDCl_3$) δ: 0.88 (6H, t), 1.19-1.36 (44H, m), 1.65-1.70 (4H, m), 3.14-3.18 (4H, m), 3.62 (2H, q);

$^{19}$F NMR ($CDCl_3$) δ: −66.4 (3F, t), −134.0 (8F, m), −163.4 (4F, t), −167.6 (8F, t).

Production Example 10

Synthesis of N,N-dihexadecyl-2,2,2-trifluoroethylamine

1-Hexadecanal (4.0 g, 16.6 mmol), 2,2,2-trifluoroethylamine (0.84 g, 8.5 mmol), and acetic acid (0.5 mL) were dissolved in tetrahydrofuran (50 mL), sodium triacetoxyborohydride (4.0 g, 18.9 mmol) was added, and the mixture was stirred at room temperature for 15 hr. The reaction mixture was basified by adding saturated aqueous sodium hydrogen carbonate solution, and extracted with n-hexane. The organic layer was washed with saturated brine, dried over anhydrous sodium sulfate, and concentrated under reduced pressure. The residue was purified by silica gel column chromatography (n-hexane/ethyl acetate=100/0-95/5) to give the title compound (4.56 g, 98%).

$^1$H NMR ($CDCl_3$) δ: 0.88 (6H, t), 1.26-1.43 (56H, m), 2.56 (4H, t), 3.00 (2H, q);

$^{19}$F NMR ($CDCl_3$) δ: −71.3 (3F, t).

Production Example 11

Synthesis of N,N-dihexadecyl-2,2,2-trifluoroethylamine hydrochloride

N,N-Dihexadecyl-2,2,2-trifluoroethylamine (1.50 g, 2.74 mmol) obtained in Production Example 10 was dissolved in n-hexane (30 mL), 1.0 M hydrogen chloride-diethyl ether solution (20 mL) was added, and the mixture was stirred for 1 hr. The reaction mixture was concentrated under reduced pressure to give the title compound (1.55 g, 97%).

$^1$H NMR ($CDCl_3$) δ: 0.88 (6H, t), 1.19-1.40 (52H, m), 1.93 (4H, br s), 3.15 (4H, br s), 3.77 (2H, q);

$^{19}F$ NMR ($CDCl_3$) δ: −63.4 (3F, t).

Production Example 12

Synthesis of N,N-dihexadecyl-2,2,2-trifluoroethylammonium tetrakis(pentafluorophenyl)borate N,N-Dihexadecyl-2,2,2-trifluoroethylamine hydrochloride (0.60 g, 1.03 mmol) obtained in Production Example 11 was dissolved in chloroform (30 mL), lithium tetrakis(pentafluorophenyl)borate tri-diethyl ether complex (0.95 g, 1.05 mmol) was added, and the mixture was stirred at room temperature for 1 hr. Insoluble material was removed by filtration, and the filtrate was concentrated under reduced pressure. The residue was dried under reduced pressure at 70° C. to give the title compound (1.51 g).

$^{1}H$ NMR ($CDCl_3$) δ: 0.88 (6H, t), 1.19-1.36 (54H, m), 1.65-1.70 (4H, m), 3.14-3.18 (4H, m), 3.62 (2H, q);

$^{19}F$ NMR ($CDCl_3$) δ: −66.4 (3F, t), −134.0 (8F, m), −163.4 (4F, t), −167.6 (8F, t).

Example 23

N,N-Dihexadecyl-2,2,2-trifluoroethylamine hydrochloride (8.10 g, 13.9 mmol) obtained in Production Example 11 was dissolved in dichloromethane (80 mL), ditetradecyl ether (8.10 g, 13.9 mmol) and lithium tetrakis(pentafluorophenyl)borate tri-diethyl ether complex (14.2 g, 13.7 mmol) was added, and the mixture was stirred at room temperature for 1 hr. Water was added to the reaction mixture, and the mixture was stirred at room temperature for 1 hr. The aqueous layer was separated, and the organic layer was washed with water. The organic layer was dried over anhydrous sodium sulfate, and then filtered, and the filtrate was concentrated under reduced pressure. The residue was dried under reduced pressure at 80° C. to give a composition (22.5 g) containing N,N-dihexadecyl-2,2,2-trifluoroethylammonium tetrakis(pentafluorophenyl)borate and ditetradecyl ether.

$^{1}H$ NMR ($CDCl_3$) δ: 0.87-0.89 (12H, m), 1.20-1.80 (104H, m), 3.21-3.24 (4H, m), 3.38-3.41 (4H, m), 3.69 (2H, q);

$^{19}F$ NMR ($CDCl_3$) δ: −66.7 (3F, brs), −134.0 (8F, m), −163.4 (4F, t), −167.5 (8F, t).

n-Hexane was added to the composition obtained in Example 23 to prepare a 20 wt % n-hexane solution thereof, and the solution was confirmed to be a homogeneous solution.

Example 24

N,N-Dihexadecyl-2,2,2-trifluoroethylammonium tetrakis (pentafluorophenyl)borate (439.2 mg, 0.36 mmol) obtained in Production Example 12 was mixed with didodecyl ether (254 mg, 0.72 mmol), and n-hexane (1.756 g) was added to prepare a homogeneous n-hexane solution of a composition containing N,N-dihexadecyl-2,2,2-trifluoroethylammonium tetrakis(pentafluorophenyl)borate and didodecyl ether. The solution was confirmed to be a homogeneous solution. This solution was concentrated under reduced pressure and analyzed by NMR.

$^{1}H$ NMR ($CDCl_3$) δ: 0.87-0.91 (12H, m), 1.20-1.42 (100H, m), 1.53-1.69 (12H, m), 3.20-3.24 (4H, m), 3.40 (8H, t), 3.67 (2H, q);

$^{19}F$ NMR ($CDCl_3$) δ: −66.9 (3F, t), −134.0 (8F, m), −163.8 (4F, t), −167.4 (8F, t).

Example 25

Ditetradecyl ether (5.96 g, 14.3 mmol) and lithium tetrakis(pentafluorophenyl)borate tri-diethyl ether complex (5.00 g, 4.81 mmol) were suspended in dichloroethane (25 mL), 6 M hydrochloric acid (5.5 mL, 30.0 mmol) was added, and the mixture was stirred at room temperature for 2 hr. The organic layer was obtained and washed with water (10 mL). The organic layer was dried over anhydrous sodium sulfate, concentrated under reduced pressure, and dried under reduced pressure at room temperature for 16 hr to give a composition (10.4 g) containing hydrogenated tetrakis(pentafluorophenyl)borate bis(ditetradecyl ether) complex and ditetradecyl ether.

$^{1}H$ NMR ($CDCl_3$) δ: 0.88 (18H, t), 1.20-1.30 (94H, m), 1.56-1.60 (12H, m), 3.57 (12H, t);

$^{19}F$ NMR ($CDCl_3$) δ: −134.0 (8F, m), −163.8 (4F, t), −167.8 (8F, t).

n-Hexane was added to the composition obtained in Example 25 to prepare a 20 wt % n-hexane solution thereof, and the solution was confirmed to be a homogeneous solution.

Comparative Example 1

It was confirmed that a hydrogenated tetrakis(pentafluorophenyl)borate diethyl ether complex obtained by a method known per se (see, for example, Organometallics, 2000, 19, 1442-1444) is hardly soluble in aliphatic hydrocarbon solvents such as hexane, cyclohexane, and the like. In the below-mentioned Experimental Example, the hydrogenated tetrakis(pentafluorophenyl)borate diethyl ether complex was used as the cocatalyst of Comparative Example 1.

Comparative Example 2

Attempts were made to prepare a 10 wt % n-hexane solution of N,N-dioctadecylmethylammonium tetrakis(pentafluorophenyl)borate obtained by a method known per se (see, for example, U.S. Pat. No. 6,121,185, the specification), but a homogeneous solution was not obtained. In the below-mentioned Experimental Example, N,N-dioctadecylmethylammonium tetrakis(pentafluorophenyl)borate was used as a cocatalyst in Comparative Example 2.

[Experimental Example] (Evaluation of Polymerization Performance)

A general polymerization method using the composition (complex) of the present invention as a cocatalyst is shown below.

Into 100 mL autoclave in a glove box were added 1-octene, triisobutylaluminum (TIBA, 0.55 M n-hexane solution), and a solvent (methylcyclohexane (MCH) or toluene) to give a comonomer solution. Dimethylsilylene (tert-butylamide)-(tetramethylcyclopentadienyl)-titanium (IV)-dichloride (CGC, polymerization catalyst), triisobutylaluminum (0.55 M n-hexane solution), and a solvent were added to prepare a catalyst solution at a predetermined concentration, and the solution was transferred to a Schlenk flask. The composition (cocatalyst) of the present invention was dissolved in a solvent, and a cocatalyst solution at a predetermined concentration was prepared and transferred to the Schlenk flask. The comonomer solution, the catalyst solution, and the cocatalyst solution were mixed, and adjusted such that the total amount of the solvent and the total amount of triisobutylaluminum would be constant. The inside of the autoclave was purged with ethylene gas, the catalyst solution and the cocatalyst solution were successively added to the autoclave, and the ethylene gas pressure was immediately adjusted to a predetermined pressure, and the mixture was stirred at a predetermined temperature (25° C. or 100° C.) for a predetermined time. The reaction mixture was ice-cooled, the ethylene gas was removed, the mixture was poured into methanol (100 mL) containing hydrochloric acid (3 mL), and the mixture was stirred at room temperature for 30 min. The precipitate was collected by filtration and dried under reduced pressure at 60° C. to give an ethylene-octene copolymer.

Measurement of Melting Point

Measurement by the differential scanning calorimetry method (DSC) was performed using DSC6220 instrument (Seiko Instruments Inc.). A sample (polymer) was heated at a rate of 10° C./min from 40° C. to 150° C., and the melting point was measured.

The results of the polymerization reaction at 25° C. and 100° C. are shown in Table 1 and Table 2, respectively.

TABLE 1

| cocatalyst | catalyst amount (μmol) | solvent | time (min) | yield (g) | activity (kg/mol of Ti · h) | melting point (° C.) |
|---|---|---|---|---|---|---|
| Comparative Example 2 | 0.3 | MCH | 6 | 0.119 | 3967 | 83.8 |
| Example 2 | 0.1 | MCH | 3 | 0.192 | 38400 | 82.5 |
| Example 3 | 0.1 | MCH | 3 | 0.276 | 55200 | 82.8 |
| Example 5 | 0.1 | MCH | 3 | 0.036 | 7200 | 71.9 |
| Example 10 | 0.05 | MCH | 1.5 | 0.078 | 62400 | 66.5 |
| Example 13 | 0.05 | MCH | 1.5 | 0.134 | 107200 | 63.3, 68.0 |
| Comparative Example 1 | 0.1 | toluene | 1.5 | 0.75 | 300000 | 70.9 |
| Example 3 | 0.1 | toluene | 1.5 | 1.2 | 480000 | 72.4 |
| Example 10 | 0.05 | toluene | 1.5 | 0.845 | 676000 | 86.0 |

Reaction conditions; catalyst: CGC, catalyst:cocatalyst = 1:1, TIBA (total amount 3000 μmol), total amount of solvent (40 mL), 1-octene (1 mL), ethylene pressure (8 atm), 25° C.

TABLE 2

| cocatalyst | catalyst amount (μmol) | solvent | time (min) | yield (g) | activity (kg/mol of Ti · h) | melting point (° C.) |
|---|---|---|---|---|---|---|
| Comparative Example 2 | 0.02 | MCH | 3 | 0.026 | 26000 | 90.0 |
| Example 3 | 0.02 | MCH | 3 | 0.23 | 232300 | 90.3 |
| Example 13 | 0.02 | MCH | 3 | 0.15 | 145300 | 93.2 |

Reaction conditions; catalyst: CGC, catalyst:cocatalyst = 1:1, TIBA (total amount 100 μmol), total amount of solvent (40 mL), 1-octene (1 mL), ethylene pressure (8 atm), 100° C.

According to Table 1 and Table 2, the compositions (or complexes) of the present invention (Examples 2, 3, 5, 10, and 13) all showed higher activity than the compound of Comparative Example 2 in the polymerization reaction in methylcyclohexane (MCH) regardless of the polymerization temperature. The compositions (or complexes) of the present invention (Examples 3 and 10) also showed higher activity than the compound of Comparative 1 (Table 1) in the polymerization reaction in toluene. Furthermore, as shown in Table 1, the compositions (or complexes) of the present invention (Examples 2, 3, 5, 10, and 13) afforded polymers having a lower melting point than Comparative Example depending on the polymerization conditions, and the uptake amount of comonomer is considered to have increased.

INDUSTRIAL APPLICABILITY

The composition of the present invention is soluble (or easily soluble) in hydrocarbon solvents, particularly aliphatic hydrocarbon solvents, and does not become a catalyst poison. Thus, it is useful as a cocatalyst for polymerization of olefins and dienes.

This application is based on patent application Nos. 2020-043244 filed in Japan (filing date: Mar. 12, 2020), 2020-144176 filed in Japan (filing date: Aug. 28, 2020), and 2020-196703 filed in Japan (filing date: Nov. 27, 2020), the contents of which are incorporated in full herein.

The invention claimed is:

1. A composition, comprising:

a compound of formula (4)

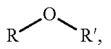

(4)

wherein

R and R' are each independently a $C_{1-30}$ alkyl group or an optionally substituted $C_{6-14}$ aryl group; and a compound of formula (1):

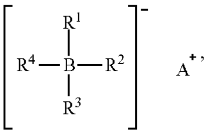

(1)

wherein $R^1$, $R^2$, $R^3$ and $R^4$ are each independently a $C_{6-14}$ aryl group substituted by one or more fluorine atoms or one or more fluoro $C_{1-4}$ alkyl groups, and $A^+$ is $H^+$, a cation having a total carbon number of not less than 25 and having formula (2):

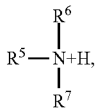

(2)

$R^5$, $R^6$, and $R^7$ are each independently an optionally substituted $C_{1-30}$ alkyl group, or an optionally substituted $C_{6-14}$ aryl group, or a cation having a total carbon number of not less than 25 and having formula (3):

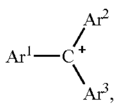

(3)

$Ar^1$, $Ar^2$, and $Ar^3$ are each independently a $C_{6-14}$ aryl group optionally substituted by one or more $C_{1-30}$ alkyl groups or $C_{1-30}$ alkoxy groups, provided that when $A^+$ is a $H^+$, a total carbon number of R and R' is not less than 25, and a content of the compound of formula (4) with respect to 1 mol of the compound of formula (1) is not less than 2 mol, and when $A^+$ is a cation of formula (2) or a cation of formula (3), a total carbon number of R and R' is not less than 8.

2. The composition claim 1, wherein $R^1$, $R^2$, $R^3$, and $R^4$ are each independently a phenyl group, a 1-naphthyl group, a 2-naphthyl group, a 2-biphenylyl group, a 3-biphenylyl group, a 4-biphenylyl group, a 1-anthryl group, a 2-anthryl group, a 9-anthryl group, a 9-phenanthryl group, or a 3-phenanthryl group, each of which is substituted by one or more fluorine atoms or trifluoromethyl groups.

3. The composition of claim 1, wherein all of $R^1$, $R^2$, $R^3$, and $R^4$ are pentafluorophenyl groups, 2,2',3,3',4',5,5',6,6'-nonafluoro-4-(1,1'-biphenylyl) groups, 2,3,4,5,6,7,8-heptafluoro-1-naphthyl groups, or 1,3,4,5,6,7,8-heptafluoro-2-naphthyl groups.

4. The composition of claim 1, wherein $A^+$ is a hydrogen ion.

5. The composition of claim 1, wherein $A^+$ is a cation having a total carbon number of not less than 35 and having formula (2), and $R^5$, $R^6$, and $R^7$ are each independently a $C_{1-30}$ alkyl group, or a $C_{6-14}$ aryl group optionally substituted by substituent(s) comprising (1) a halogen atom, (2) a $C_{1-30}$ alkyl group, (3) a $C_{1-30}$ alkoxy group, and/or (4) a halo $C_{1-30}$ alkyl group.

6. The composition of claim 1, wherein $A^+$ is a cation having a total carbon number of not less than 35 and having formula (2), $R^5$ is a $C_{6-14}$ aryl group optionally substituted by substituent(s) comprising (1) a halogen atom, (2) a $C_{1-30}$ alkyl group, (3) a $C_{1-30}$ alkoxy group, and/or (4) a halo $C_{1-6}$ alkyl group, and $R^6$ and $R^7$ are each independently an optionally substituted $C_{1-30}$ alkyl group.

7. The composition of claim 1, wherein $A^+$ is a cation having a total carbon number of not less than 35 and having formula (2), $R^5$ is a $C_{1-30}$ alkyl group substituted by a $C_{6-14}$ aryl group substituted by one or more fluorine atoms, or a $C_{1-30}$ alkyl group substituted by one or more fluorine atoms, and $R^6$ and $R^7$ are each independently a $C_{1-30}$ alkyl group optionally substituted by substituent(s) comprising (1) a $C_{6-14}$ aryl group optionally substituted by halogen atom(s), (2) a halogen atom, and/or (3) a $C_{1-30}$ alkoxy group.

8. The composition of claim 1, wherein $A^+$ is a cation having a total carbon number of not less than 35 and having formula (2), $R^5$ is a fluoro $C_{1-6}$ alkyl group, and $R^6$ and $R^7$ are each independently a $C_{1-30}$ alkyl group optionally substituted by substituent(s) comprising (1) a $C_{6-14}$ aryl group optionally substituted by halogen atom(s), (2) a halogen atom, and/or (3) a $C_{1-30}$ alkoxy group.

9. The composition of claim 1, wherein $A^+$ is a cation having a total carbon number of not less than 35 and having formula (3), and $Ar^1$, $Ar^2$, and $Ar^3$ are each independently a phenyl group optionally substituted by a $C_{1-30}$ alkyl group or a $C_{1-30}$ alkoxy group.

10. The composition of claim 1, wherein $A^+$ is $H^+$, and

R and R' are each independently a $C_{1-30}$ alkyl group or a $C_{6-14}$ aryl group optionally substituted by substituent(s) comprising (1) a halogen atom, (2) a $C_{1-30}$ alkyl group, (3) a $C_{1-30}$ alkoxy group, (4) a halo $C_{1-30}$ alkyl group, and/or (5) a halo $C_{1-30}$ alkoxy group.

11. The composition of claim 1, wherein $A^+$ is W, and R and R' are each independently a $C_{1-30}$ alkyl group.

12. The composition of claim 1, wherein $A^+$ is $H^+$,

R and R' are each independently a $C_{14-30}$ alkyl group, and the total carbon number of R and R' is not less than 28.

13. The composition of claim 1, wherein $A^+$ is $H^+$, and R and R' are the same group.

14. The composition of claim 4, wherein $A^+$ is the cation of formula (2) or the formula (3), R and R' are each independently a $C_{1-30}$ alkyl group, and the total carbon number of R and R' is not less than 8.

15. The composition of claim 1, wherein a content of the compound of formula (4) with respect to 1 mol of the compound of formula (1) is in a range of from 0.01 to 10 mol, and wherein $A^+$ is the cation of formula (2) or formula (3).

16. The composition of claim 1, wherein a content of the compound of formula (4) with respect to 1 mol of the compound of formula (1) is in a range of from 0.01 to 3 mol, and wherein $A^+$ is the cation of formula (2) or formula (3).

17. The composition of claim 1, having a solubility of not less than 5 wt % in n-hexane, isohexane, n-heptane, n-octane, cyclohexane, methylcyclohexane, or a mixed solvent thereof at 25° C.

18. The composition of claim 1, substantially free of an ether having a total carbon number of not more than 7.

19. A cocatalyst suitable for polymerizing a monomer comprising an olefin and/or a diene, the cocatalyst consisting of:

the composition of claim 1.

20. A method for producing a polymer, the method comprising:

polymerizing a monomer comprising in olefin and/or a diene with the composition of claim 1 as a cocatalyst.

* * * * *